United States Patent
Lindee et al.

(10) Patent No.: US 7,416,753 B2
(45) Date of Patent: Aug. 26, 2008

(54) BREATHER SYSTEM FOR A RECIPROCATING MOLD PLATE PATTY-FORMING MACHINE

(75) Inventors: Scott A. Lindee, Mokena, IL (US); David Hansen, Orland Park, IL (US); David Hancock, Morris, IL (US)

(73) Assignee: Formax, Inc., Mokena, IL (US)

( * ) Notice: Subject to any disclaimer, the term of this patent is extended or adjusted under 35 U.S.C. 154(b) by 850 days.

(21) Appl. No.: 10/942,755

(22) Filed: Sep. 16, 2004

(65) Prior Publication Data

US 2005/0072314 A1 Apr. 7, 2005

Related U.S. Application Data

(60) Provisional application No. 60/515,585, filed on Oct. 29, 2003, provisional application No. 60/503,354, filed on Sep. 16, 2003.

(51) Int. Cl.
*A22C 7/00* (2006.01)
(52) U.S. Cl. .............. 426/513; 426/512; 425/572; 264/101; 264/102; 264/328.8; 264/328.12
(58) Field of Classification Search .......... 425/572; 264/328.8, 328.12, 101, 102; 426/512, 513
See application file for complete search history.

(56) References Cited

U.S. PATENT DOCUMENTS

| | | | |
|---|---|---|---|
| 3,747,160 A | 7/1973 | Holly et al. | |
| 3,952,478 A | 4/1976 | Richards et al. | |
| 4,054,967 A | 10/1977 | Sandberg et al. | |
| RE30,096 E | 9/1979 | Richards | |
| 4,187,581 A | 2/1980 | Wagner | |
| 4,205,415 A | 6/1980 | Orchard | |
| 4,356,595 A | 11/1982 | Sandberg et al. | |

(Continued)

FOREIGN PATENT DOCUMENTS

WO   WO 01/41575 A1   6/2001

(Continued)

*Primary Examiner*—Robert B. Davis
*Assistant Examiner*—Maria Veronica Ewald
(74) *Attorney, Agent, or Firm*—The Law Office of Randall T. Erickson, P.C.

(57) ABSTRACT

A breather air and food product fines pumping system for a reciprocating mold plate food product forming machine pumps air and fines to a collection area. A pumping surface is provided by a rearward facing surface of the mold plate. A pumping chamber is arranged between the pumping surface and a food product fines collection area. The rearward facing surface of the mold plate defines a movable limit of the pumping chamber. A valve element of a first valve is arranged between the pumping chamber and the collection area to create suction in the pumping chamber when the rearward facing surface of the mold plate is moving forward, and to allow the pumping chamber to pump air and fines into the collection area when the rearward facing surface of the mold plate is moving rearward. Breather holes in a breather plate are in communication with a breather passage that is in communication with the pumping chamber and with outside air through further valve arrangements. The further valve arrangements and the first valve act to flush the breather passage with outside air to drive air and fines in the breather passage into the pumping chamber where it is then pumped to the collection area.

7 Claims, 33 Drawing Sheets

U.S. PATENT DOCUMENTS

| | | |
|---|---|---|
| 4,372,008 A | 2/1983 | Sandberg |
| 4,535,505 A | 8/1985 | Holly |
| 4,697,308 A | 10/1987 | Sandberg |
| 4,768,941 A | 9/1988 | Wagner |
| 4,821,376 A | 4/1989 | Sandberg |
| 4,872,241 A | 10/1989 | Lindee |
| 4,996,743 A | 3/1991 | Janssen |
| 6,416,314 B1 * | 7/2002 | LaBruno .................... 425/546 |
| 6,454,559 B1 | 9/2002 | Lindee |
| 6,517,340 B2 | 2/2003 | Sandberg |
| 6,572,360 B1 | 6/2003 | Buhlke et al. |
| 7,014,456 B1 * | 3/2006 | Tournour et al. ............ 425/572 |

FOREIGN PATENT DOCUMENTS

| | | |
|---|---|---|
| WO | WO 02/102166 A1 | 12/2002 |

* cited by examiner

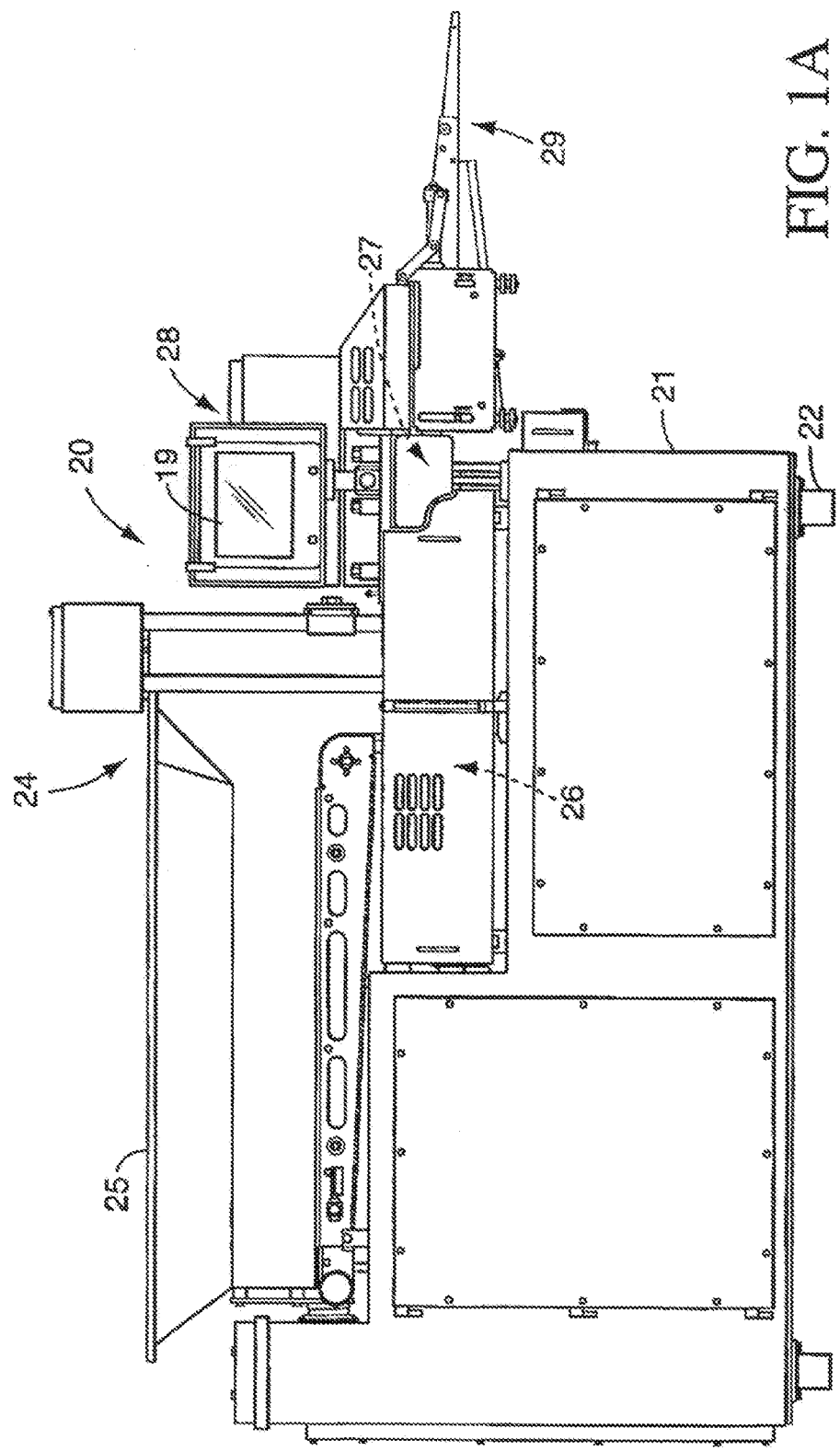

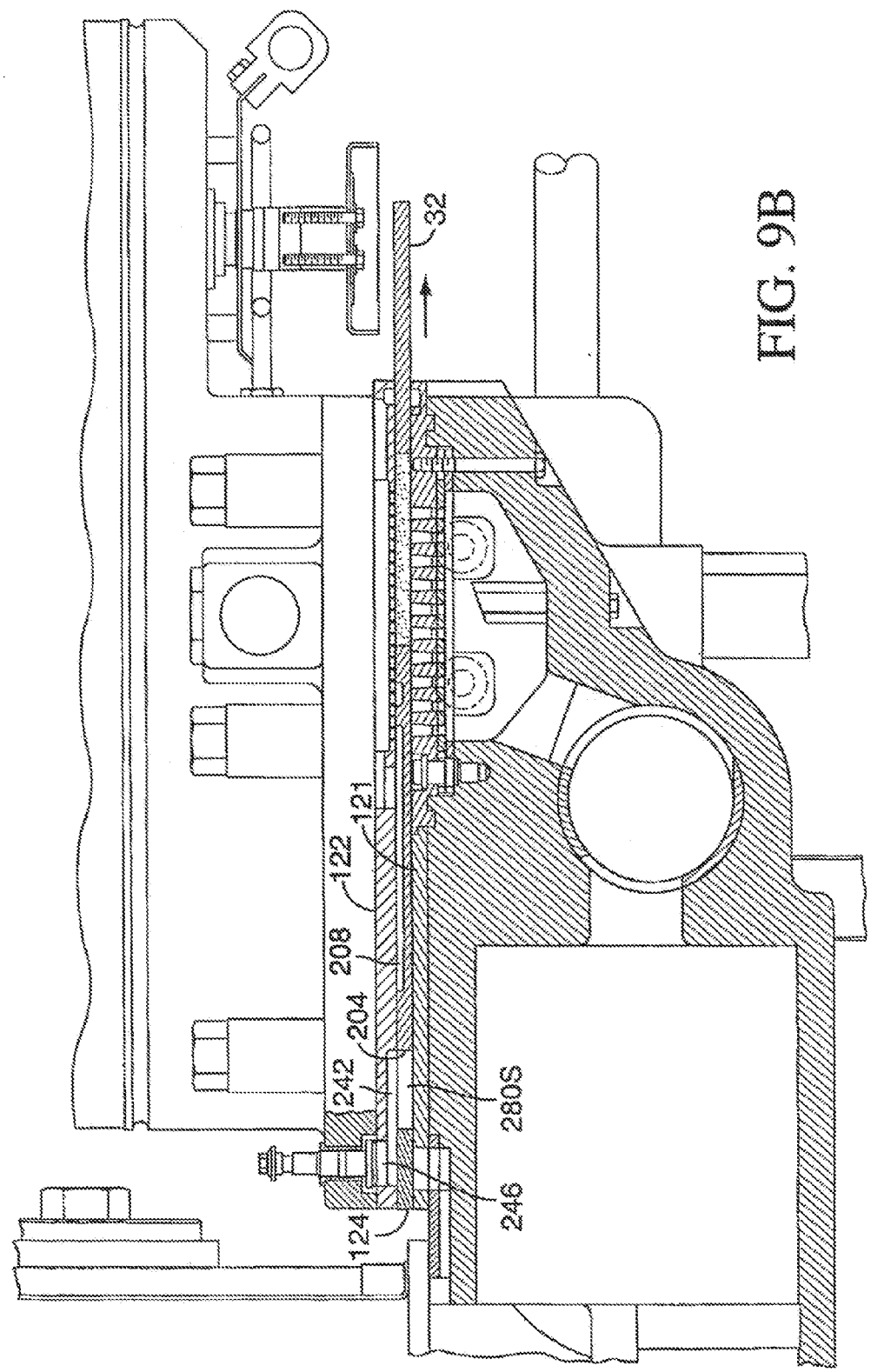

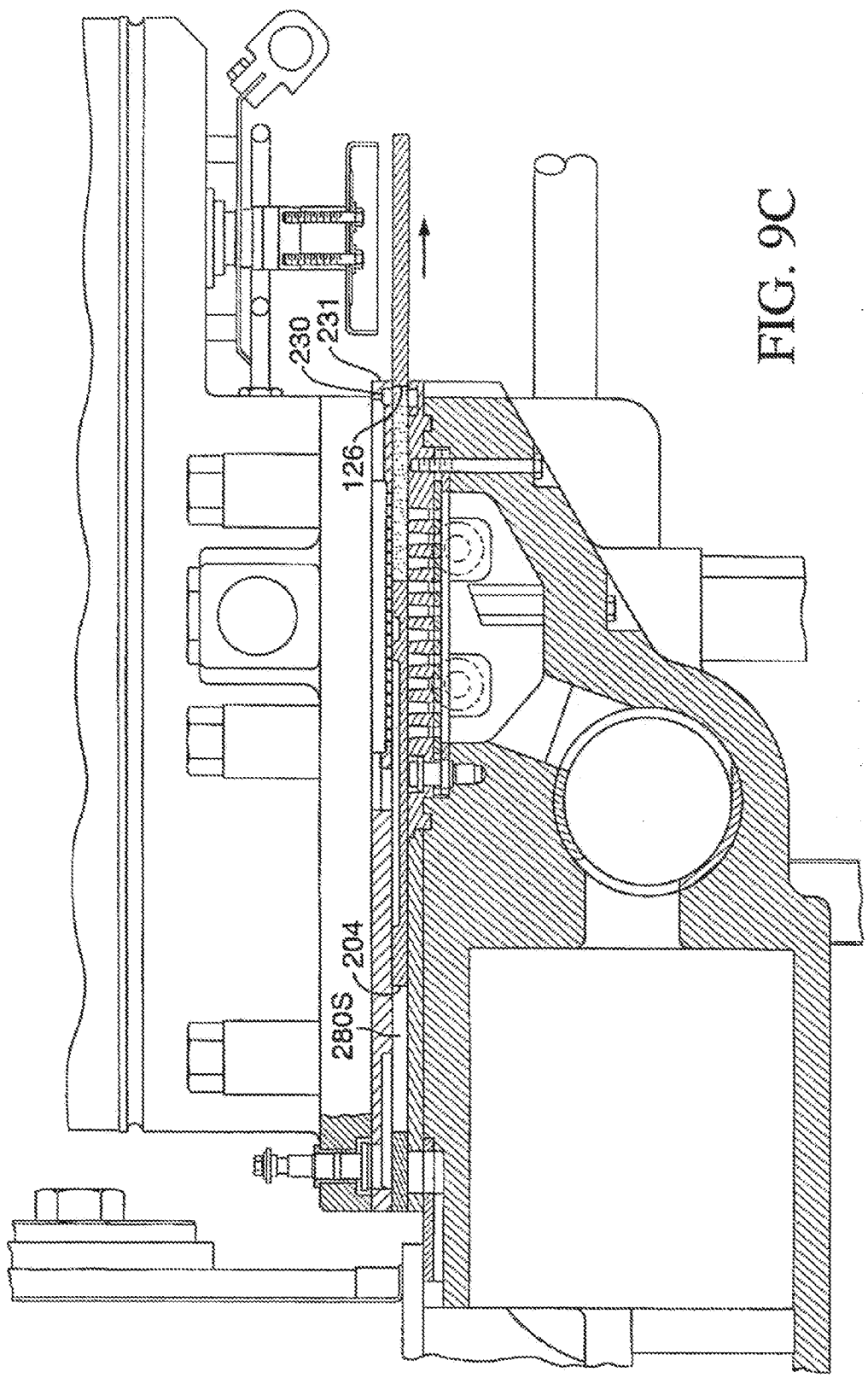

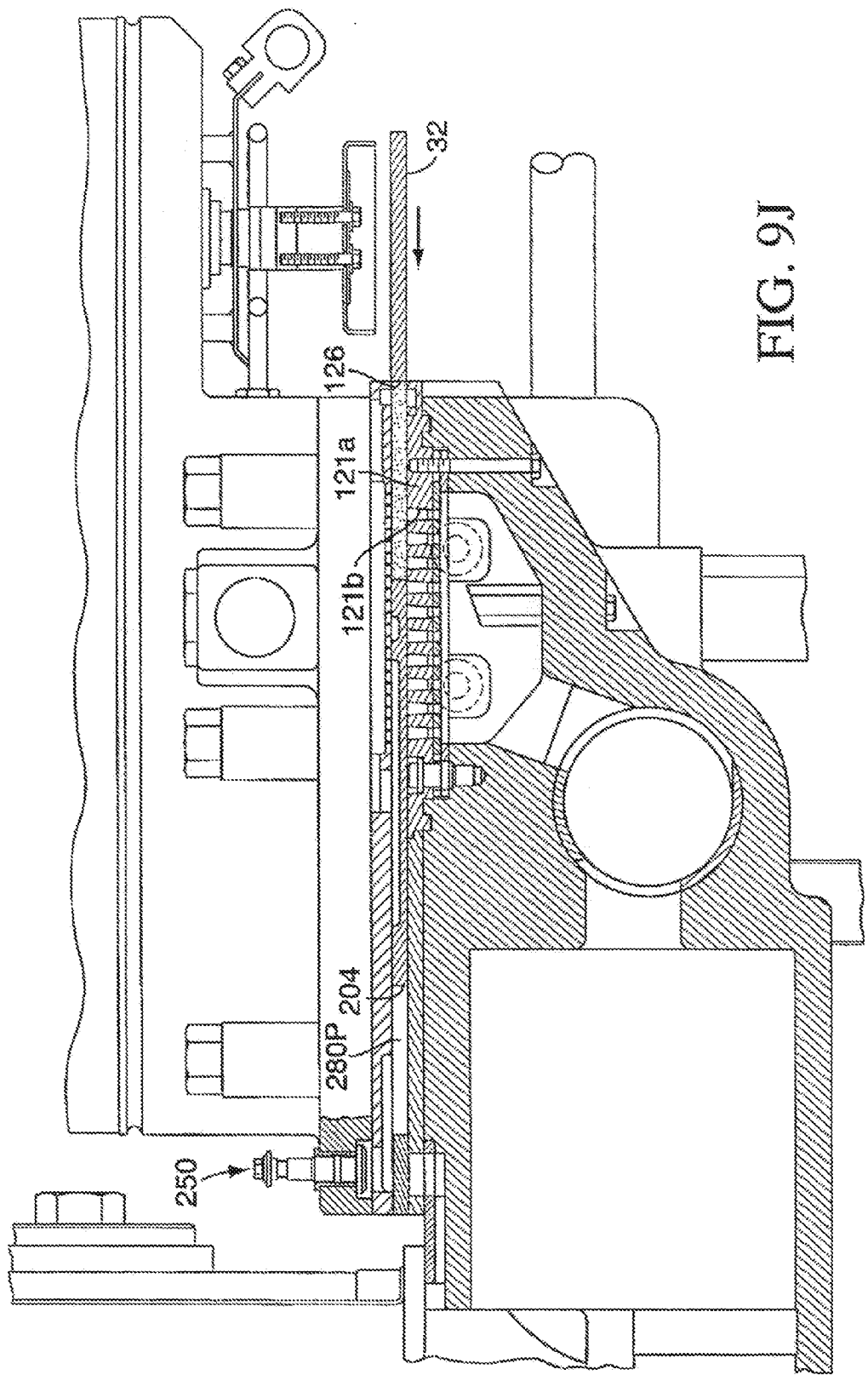

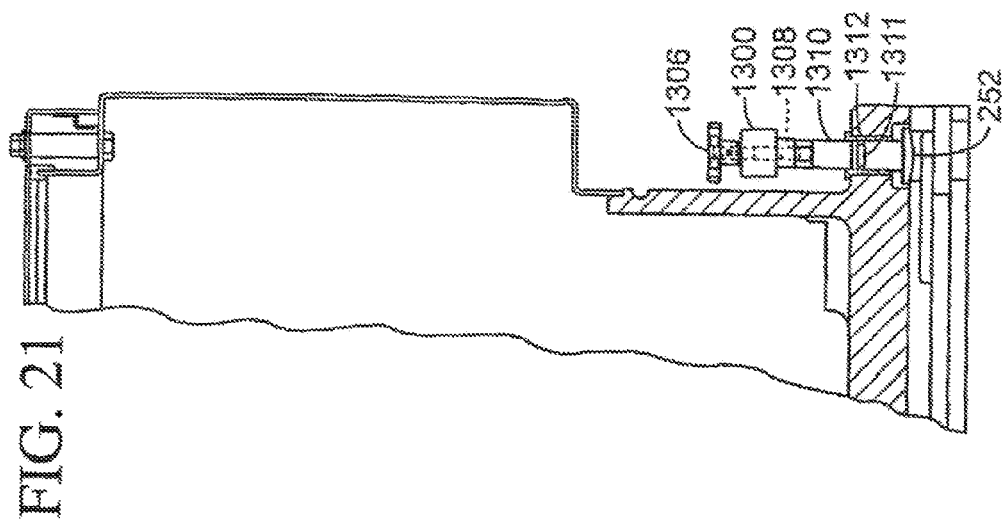
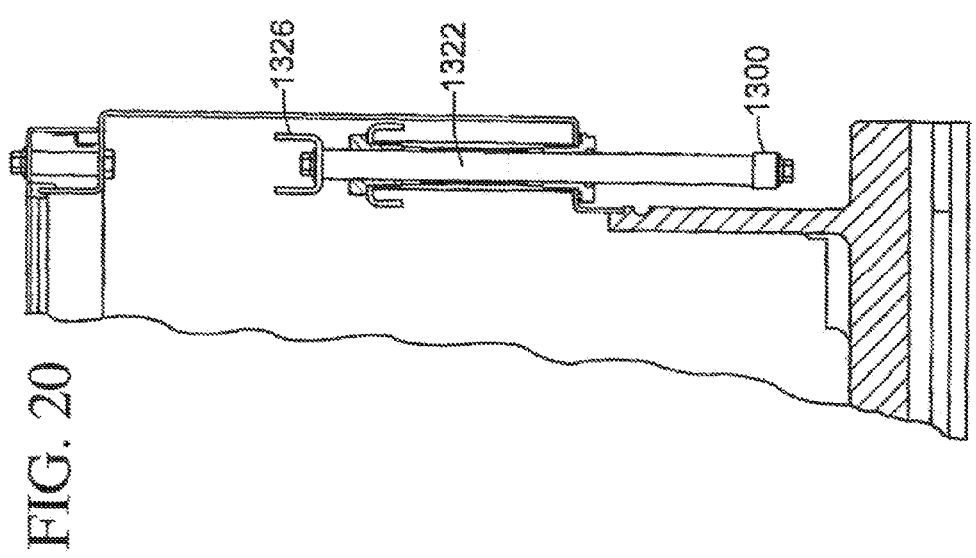

US 7,416,753 B2

BREATHER SYSTEM FOR A RECIPROCATING MOLD PLATE PATTY-FORMING MACHINE

This application claims the benefit of U.S. provisional application Ser. No. 60/503,354, filed Sep. 16, 2003, and U.S. provisional application Ser. No. 60/515,585, filed Oct. 29, 2003.

BACKGROUND OF THE INVENTION

Use of pre-processed foods, both in homes and in restaurants, has created a demand for high-capacity automated food processing equipment. That demand is particularly evident with respect to hamburgers, molded steaks, fish cakes, and other molded food patties.

Food processors utilize high-speed molding machines, such as FORMAX F-6, F-12, F-19, F-26 or F-400 reciprocating mold plate forming machines, available from Formax, Inc. of Mokena, Ill., U.S.A., for supplying patties to the fast food industry. Prior known high-speed molding machines are also described for example in U.S. Pat. Nos. 3,887,964; 4,372,008; 4,356,595; 4,821,376; and 4,996,743 herein incorporated by reference.

Although heretofore known FORMAX patty-molding machines have achieved commercial success and wide industry acceptance, the present inventors have recognized that needs exist for a forming machine having an even greater energy efficiency, an even greater durability and an even greater duration of maintenance free operation. The present inventors have recognized that needs exist for an enhanced controllability and ability to tune a patty-forming machine for particular food materials to be processed, for an enhanced effectiveness of a patty-forming machine in producing uniform patties, for an even greater output rate of patties from a patty-forming machine, for an enhanced convenience for cleaning and maintenance of a patty-forming machine, and for a smoother and quieter patty-forming machine operation.

SUMMARY OF THE INVENTION

The present invention provides an improved automated food patty molding machine capable of producing uniform molded food patties at a high rate of production. The invention provides an auxiliary pumping arrangement for a breather air system in a reciprocating mold plate food product forming machine.

The invention includes a mold plate having at least one cavity for forming a patty. A pumping surface is provided that is arranged to reciprocate with the mold plate. A pumping chamber is arranged between the pumping surface and a food product fines collection area; the pumping surface defining a movable limit of the pumping chamber. A valve element of a first valve is arranged between the pumping chamber and the collection area to close the pumping chamber during at least a portion of the time when the pumping surface is moving to increase the volume of the pumping chamber, and to open the pumping chamber between the pumping surface and the collection area during at least a portion of the time when the pumping surface is moving to decrease the volume of the pumping chamber.

A cover plate or breather plate is provided that closes one side of the cavity during filling and has at least one breather air opening therethrough. An air passage is in fluid communication with the air opening for expressing air from the cavity into the air passage during filling of the cavity with pressurized food product. The air passage is in fluid communication with the pumping chamber. A second valve has a second valve element arranged between the air passage and the pumping chamber. The second valve is arranged to be open during a portion of a pressure stroke when the pumping surface is moving to decrease the volume of the pumping chamber.

According to the preferred embodiment, the pumping surface comprises the rear facing surface of the mold plate.

According to one aspect of the invention, the second valve element of the second valve is arranged to be open during a portion of a suction stroke when the pumping surface is moving to increase the volume of the pumping chamber.

According to the preferred embodiment, the second valve element of the second valve is formed by a hole in the cover plate and a solid portion of the mold plate, the hole is opened and closed by the relative position of the solid portion of the mold plate with respect to the cover plate.

According to another aspect of the invention, the pumping surface creates a vacuum in the pumping chamber during movement of the mold plate in one direction, and creates positive pressure in the pumping chamber during movement of the mold plate in an opposite direction.

According to the preferred embodiment, the apparatus comprises an improved breather air discharge system which assists in removing food product fines from the breather plate air passages and from the anti-lip passages. The discharge system includes passages and one or more check valves or control valves that create an auxiliary pump using a rear portion of the reciprocating mold plate as a mold plate plunger. The mold plate plunger first creates a vacuum within a pump cavity located behind the mold plate, during extension of the mold plate to the patty discharge position. This pump chamber is then opened to the breather plate passages, wherein air and fines are drawn by suction into the pump chamber. Outside air can be introduced at a front portion of the breather plate passages to flush the air and fines into the pump chamber. Upon retraction of the mold plate toward a fill position, the mold plate plunger compresses the air within the pump chamber, causing the check valve to open. Alternatively, the check valve is replaced by a control valve that is selectively opened by an actuator. Further movement of the mold plate plunger pumps the air and fines within the pump chamber through the check valve or control valve and into a food product fines collection area upstream of the food product pump, wherein the fines can be recycled.

The invention also provides tooling for forming an air and fines pump for a reciprocating mold plate food product forming machine, the tooling including a mold plate having a cavity for forming a patty and a relief recess located behind the cavity in a longitudinal direction of intended reciprocating movement of the mold plate. A breather plate has at least one breather hole therethrough that is registerable with the cavity when the cavity is being filled with food product in a filling position, and an air passage formed on a side of the breather plate opposite the cavity that is in fluid communication with the breather hole. The air passage has an air inlet opening located longitudinally in front of the cavity, when the cavity is in the filling position, and an air outlet located longitudinally behind the cavity when the cavity is in the filling position. The air inlet and the air outlet comprise openings through a thickness of the breather plate.

The relief recess is arranged to be in communication with outside air and with the air passage inlet when the cavity is moved from beneath the breather plate toward the discharge position. The breather plate comprises a valve inlet opening and a valve outlet opening through a thickness of the breather plate. The valve inlet and outlet openings are located at a position adjacent a rear end of the mold plate when the cavity is in the filling position.

According to another aspect of the tooling of the invention, a mold cover plate is mounted over the breather plate on a side of the breather plate opposite the mold plate, the mold cover plate comprising an air path open between the valve inlet and the valve outlet of the breather plate. A valve is mounted over the mold cover plate, the valve having a valve element arranged within the air path.

According to another aspect of the tooling of the invention, the mold plate comprises an elongated connecting recess located behind the relief recess. The elongated connecting recess is arranged to be facing the breather plate and connecting the air outlet of the air passage to the valve inlet of the breather plate when the cavity is in the filling position.

According to another aspect of the invention, a food patty-forming apparatus for forming a food patty from pressurized food product, is provided that includes a frame; a first plate carried by the frame; a second plate carried by the frame, the second plate spaced from and facing the first plate. A mold plate is arranged to reciprocate longitudinally between the first and second plates between a cavity fill position and a patty discharge position. The mold plate has a cavity, and the first plate has a fill opening in communication with the cavity when the mold plate is in the cavity fill position during reciprocation of the mold plate. When the mold plate is in the patty discharge position, the cavity is exposed outside the first plate. The mold plate comprises a thickness that defines a rearward facing surface. Sidewalls are arranged on opposite lateral sides of the mold plate between the first and second plates, and an end wall is arranged behind the mold plate between the first and second plates. A pumping or suction chamber is formed between the first and second plates, the sidewalls, the end wall, and the rearward facing surface of the mold plate. A mechanism is operatively connected to the mold plate to reciprocate the mold plate between the cavity fill position and the patty discharge position. The second plate comprises at least one fill opening therethrough that is in communication with the cavity. A food product delivery is configured to deliver pressurized food product into the fill opening. A first air passage is in communication with a side of the cavity opposite the opening and in communication with the chamber. The first air passage is blocked by the mold plate during forward movement of the mold plate from the cavity fill position, drawing a vacuum in the chamber until the rearward facing surface passes the passage. During rearward movement of the mold plate from the patty discharge position, the rearward facing surface passes the passage, the mold plate blocks the passage, and the rearward facing surface pressurizes the chamber. A second air passage is arranged between the chamber and a food product fines collection area, and an air valve is arranged in the passage. The air valve is operable to close when pressure within the chamber is below the region of low air pressure, and to open when pressure within the chamber is above the region of low air pressure. Alternatively, a controllable actuator is operatively connected to the air valve to open the air valve or close the air valve at selected times according to the position of the mold plate.

According to another aspect of the invention, a method is provided for removing air and food product fines from a reciprocating mold plate patty forming apparatus, comprising the steps of: providing a mold plate slidable along a first surface, the mold plate having a cavity that is reciprocal between a cavity fill position and a patty discharge position; providing a pressurized supply of food product material and a delivery channel for delivering pressurized food product material through the first surface and into the cavity when the reciprocating mold plate is in the cavity fill position; providing a breather plate on a side of the mold plate opposite the first surface, the breather plate having at least one breather hole that is in registry with the cavity when the mold plate is in the cavity fill position; and pumping air and food product fines that are expressed through the breather hole during filling of the cavity with pressurized food product material, to a collection area.

According to another aspect of the invention, the step of pumping air and food product fines is further defined by the steps of: providing a pumping chamber; providing an air passage in fluid communication with the breather hole; providing a first path for outside air to enter the air passage; providing a second path for outside air combined with expressed air and food product fines expressed during filling of the cavity with food product material, to exit the air passage and to enter the pumping chamber; during advancement of the mold plate to the patty discharge position, opening the first and second paths to flush outside air into the air passage and to force outside air combined with expressed air and food product fines out of the air passage and into the pumping chamber.

According to another aspect of the invention, the step of pumping air and food product fines is further defined by the steps of: during retraction of the mold plate from the patty discharge position to the cavity fill position, pumping the outside air combined with air and food product fines from the pumping chamber to the collection area.

According to another aspect of the invention, a method is provided for removing air and food product fines from a reciprocating mold plate patty forming apparatus, comprising the steps of: providing a supply of pressurized food product; providing a mold plate having a cavity; reciprocating the mold plate on a support surface between a cavity fill position and a patty discharge position; providing a breather plate above the mold plate, the breather plate having at least one breather hole and an air passage, the air passage openable to outside air and to a chamber defined between the breather plate, the support surface, and a back face of the mold plate; providing a discharge opening from the chamber to a collection area; filling the cavity with pressurized food product and expressing air and food product fines through the breather hole and into the air passage; moving the mold plate toward the patty discharge position while drawing a vacuum in the chamber; as the mold plate moves to the patty discharge position, opening the air passage to outside air to flush outside air into the air passage and into the chamber, relieving the vacuum; and as the mold plate moves toward the cavity fill position, increasing pressure within the chamber by the retraction of the end face of the mold plate to pump air and fines through the discharge opening to the collection area.

According to another aspect of the invention, a further step is provided of: during filling of the cavity with food product, providing a flow path between the air passage and the discharge opening.

According to another aspect of the invention, a further step is provided of: during movement of the mold plate from the patty discharge position to the cavity fill position, after flushing the air passage with outside air, closing the passage to outside air as movement of the mold plate end face increases pressure in the chamber.

According to another aspect of the invention, a further step is provided of: during movement of the mold plate from the cavity fill position to the patty discharge position, closing the discharge opening.

Numerous other advantages and features of the present invention will be become readily apparent from the following detailed description of the invention and the embodiments thereof, and from the accompanying drawings.

BRIEF DESCRIPTION OF THE DRAWINGS

FIG. 1A is a plan view of the patty-forming machine of FIG. 1;

FIGS. 9A-9K are enlarged fragmentary sectional views taken from FIG. 2, showing the machine configuration as the mold plate is moved along its path of reciprocation;

FIG. 20 is a sectional view taken generally along line 20-20 of FIG. 19; and

FIG. 21 is a sectional view taken generally along line 21-21 of FIG. 19.

DETAILED DESCRIPTION OF THE PREFERRED EMBODIMENTS

Figure 1:
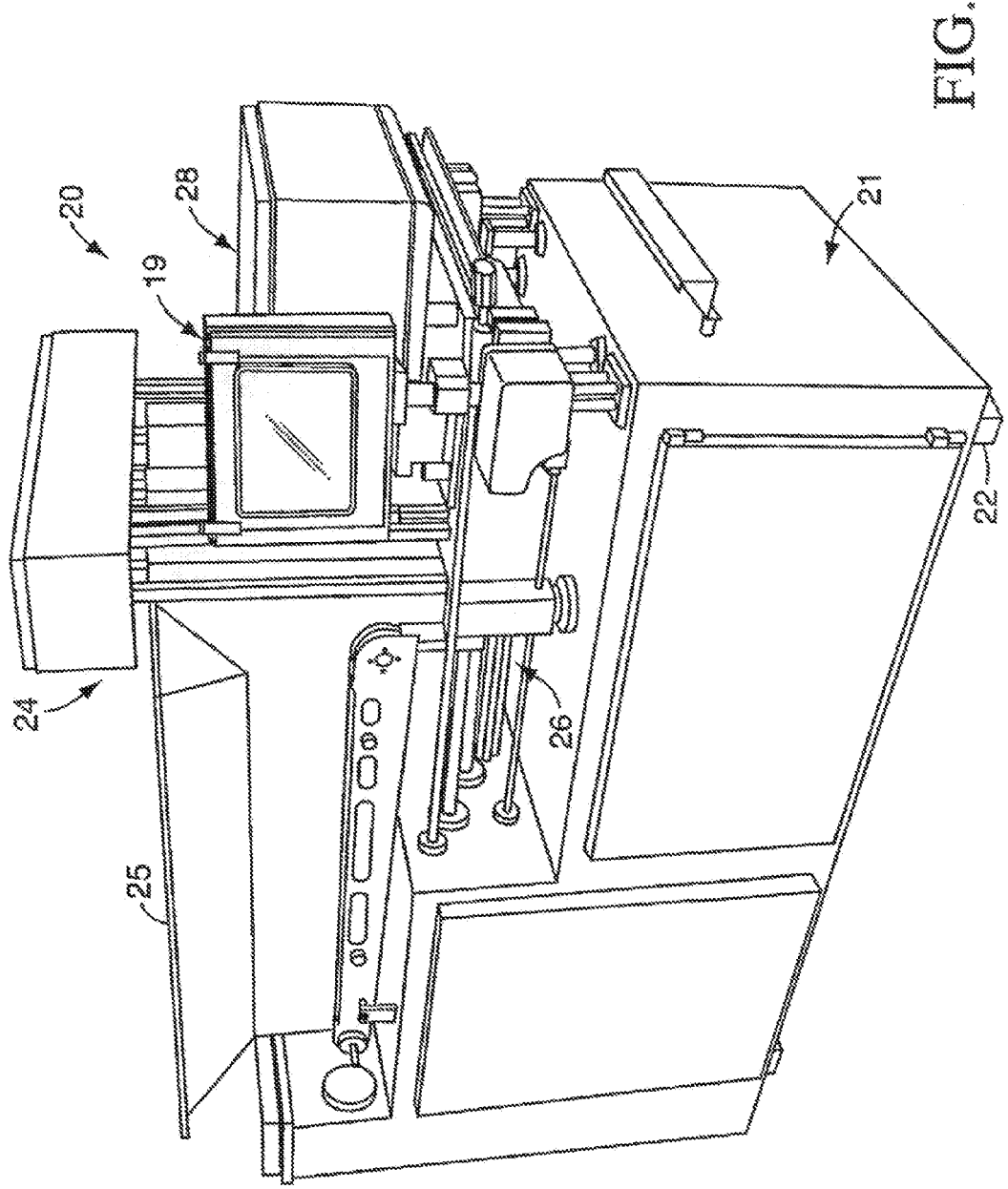
FIG. 1 is a perspective view of a patty-forming machine of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

General Description Of The Apparatus

The high-speed food patty molding machine 20 illustrated in the figures comprises a preferred embodiment of the invention. The complete machine is described in U.S. Ser. No. 10/942,627 now U.S. Pat. No. 7,255,554, filed on the same day as the present application, and herein incorporated by reference. This application also incorporates by reference U.S. Application Ser. No. 60/503,354, filed Sep. 16, 2003 and U.S. Provisional Application Ser. No. 60/515,585, filed Oct. 29, 2003.

The molding machine 20 includes a machine base 21, preferably mounted upon a plurality of feet 22, rollers or wheels. The machine base 21 supports the operating mechanism for machine 20 and can contains hydraulic actuating systems, electrical actuating systems, and most of the machine controls. The machine 20 includes a supply 24 for supplying moldable food material, such as ground beef, fish, or the like, to the processing mechanisms of the machine.

A control panel 19, such as a touch screen control panel, is arranged on a forward end of the apparatus 20 and communicates with a machine controller.

As generally illustrated in FIGS. 2-6, supply means 24 comprises a large food material storage hopper 25 that opens into the intake of a food pump system 26. The food pump system 26 includes at least two food pumps 61, 62, described in detail hereinafter, that continuously, or intermittently under a pre-selected control scheme, pump food material, under pressure, into a manifold 27 flow-connected to a cyclically operated molding mechanism 28.

In the operation of machine 20, a supply of ground beef or other moldable food material is deposited into hopper 25 from overhead. An automated refill device (not shown) can be used to refill the hopper when the supply of food product therein is depleted. The floor of hopper 25 is substantially defined by a conveyor belt 31 of a conveyor 30. The conveyor belt 31 has a top surface 31a for moving the food material longitudinally of the hopper 25 to a hopper forward end 25a.

The food material is moved by supply means 24 into the intake of plunger pumps 61, 62 of pumping system 26. The pumps 61, 62 of system 26 operate in overlapping alteration to each other; and at any given time when machine 20 is in operation, at least one of the pumps is forcing food material under pressure into the intake of manifold 27.

The manifold 27 comprises a system for feeding the food material, still under relatively high pressure, into the molding mechanism 28. Molding mechanism 28 operates on a cyclic basis, first sliding a multi-cavity mold plate 32 into a receiving position over manifold 27 (FIG. 9A) and then away from the manifold to a discharge position (FIG. 9F) aligned with a series of knock out cups 33. When the mold plate 32 is at its discharge position, knock out cups plungers or cups 33 are driven downwardly as indicated by 33A in FIG. 2, discharging hamburgers or other molded patties from machine 20. The molded patties are deposited onto a conveyor 29 (FIG. 1A), to be transported away from the apparatus 20.

Food Supply System

The food supply means 24 and associated hopper 25 are illustrated in FIGS. 2-6. As seen, the conveyor belt 31 spans completely across the bottom of hopper 25, around an end of idler roller or pulley 35 and drive roller or pulley 36, the lower portion of the belt being engaged by a tensioning roller 37. In some cases the tensioning roller 37 may not be necessary, and can be eliminated. A drum motor (not visible) is provided within the drive roller 36 for rotating the drive roller.

The forward end 25a of hopper 25 communicates with a vertical pump 38 having an outlet 39 at least partly open into a pump intake manifold chamber 41. A vertically oriented frame 42 extends above hopper 25 adjacent the right-hand side of the outlet 39. A motor housing 40 is mounted on top of the frame 42. A support plate 43 is affixed to the upper portion of frame 42 extending over the outlet 39 in hopper 25. The frame comprises four vertical tie rods 44a surrounded by spacers 44b (FIG. 5).

Figure 5:
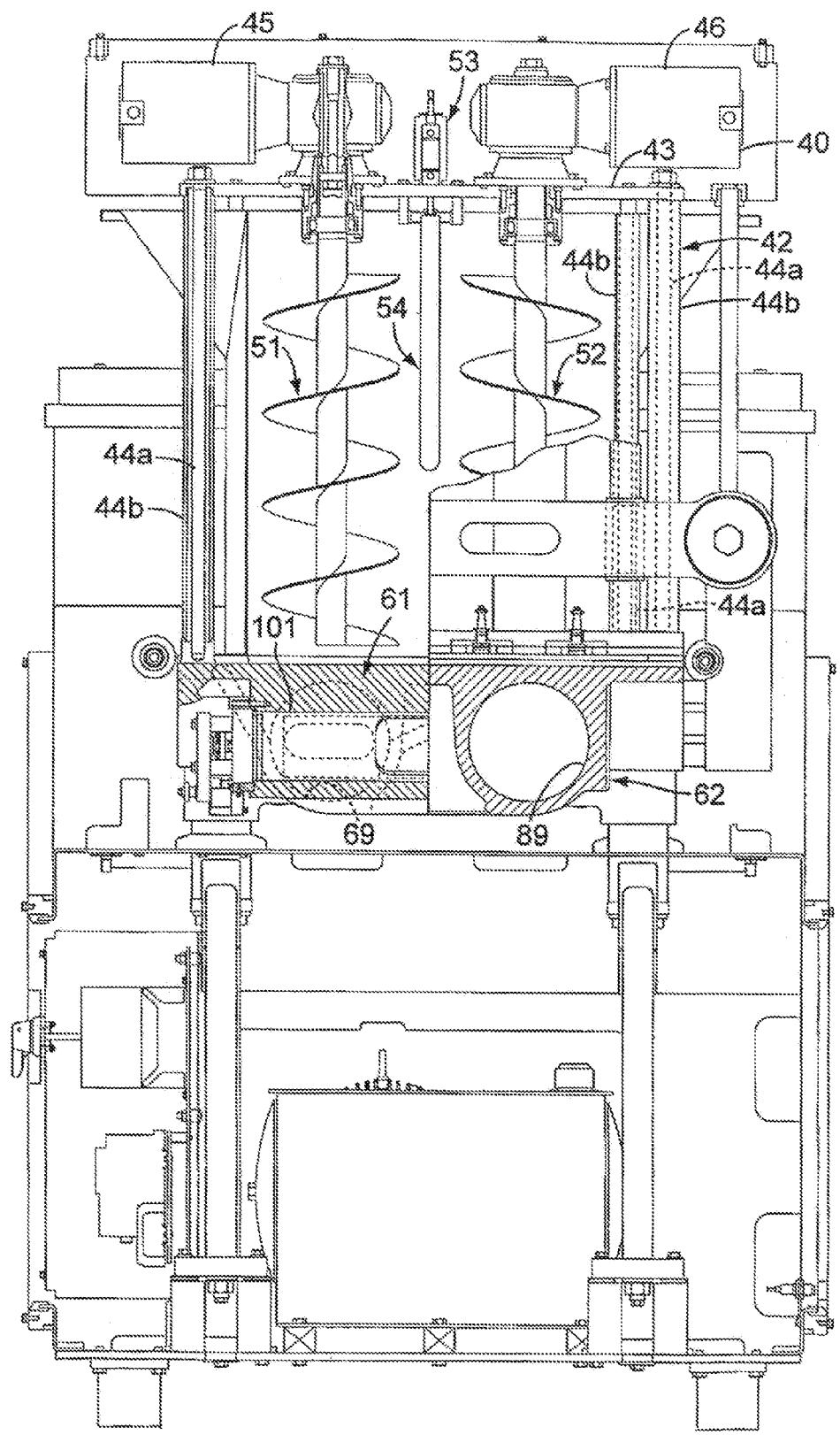
FIG. 5 is a sectional view taken generally along line 5-5 of FIG. 2, with some components and/or panels removed for clarity.

As shown in FIG. 5, the vertical pump 38 comprises two feed screw motors 45, 46 that drive feed screws 51, 52. The two electrical feed screw motors 45, 46 are mounted upon support plate 43 within the housing 40. Motor 45 drives the feed screw 51 that extends partly through opening 39 in alignment with a pump plunger 66 of the pump 61. Motor 46 drives the feed screw 52 located at the opposite side of hopper 25 from feed screw 51, and aligned with another pump plunger 68 of the pump 62.

A level sensing mechanism 53 is located at the outlet end of hopper 25 comprising an elongated sensing element 54. As the moldable food material is moved forwardly in the hopper 25, it may accumulate to a level in which it engages the sensing element 54. When this occurs, a signal is generated to interrupt the drive for the roller 36 of conveyor 31. In this manner the accumulation of food material at the forward end 25a of hopper 25 is maintained at an advantageous level.

Figure 2:
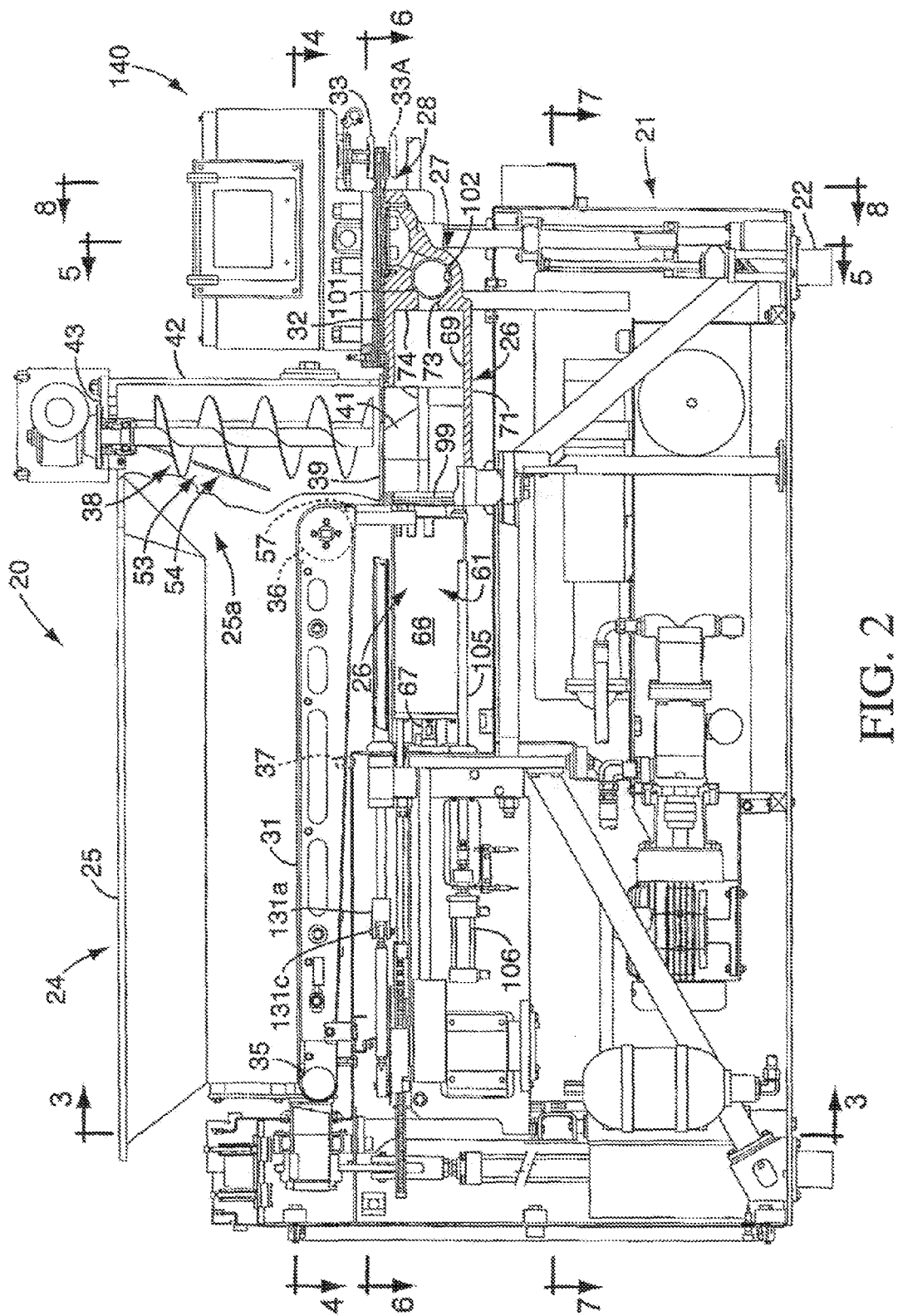
FIG. 2 is a longitudinal sectional view of the patty-forming machine of FIG. 1, with some components and/or panels removed for clarity.

When machine 20 is in operation, the feed screw motor 45 is energized whenever plunger 66 is withdrawn to the position shown in FIG. 2, so that feed screw 51 supplies meat from hopper 25 downwardly through outlet 39 into one side of the intake 41 of the food pumping system 26. Similarly, motor 46 actuates the feed screws 52 to feed meat to the other side of intake 41 whenever plunger 68 of the pump 62 is withdrawn. In each instance, the feed screw motors 45, 46 are timed to shut off shortly after the plunger is fully retracted, avoiding excessive agitation of the meat. As the supply of food material in the outlet 39 is depleted, the conveyor belt 31 continuously moves food forwardly in the hopper and into position to be engaged by the feed screws 51, 52. If the level of meat at the outlet 39 becomes excessive, conveyor 31 is stopped, as described above, until the supply at the hopper outlet is again depleted.

The wall of the outlet 39 immediately below conveyor drive rollers 36 comprises a belt wiper plate 57 that continuously engages the surface of the conveyor 31 to prevent leakage of the food material 38 from the hopper at this point.

Food Pump System

Figure 6:
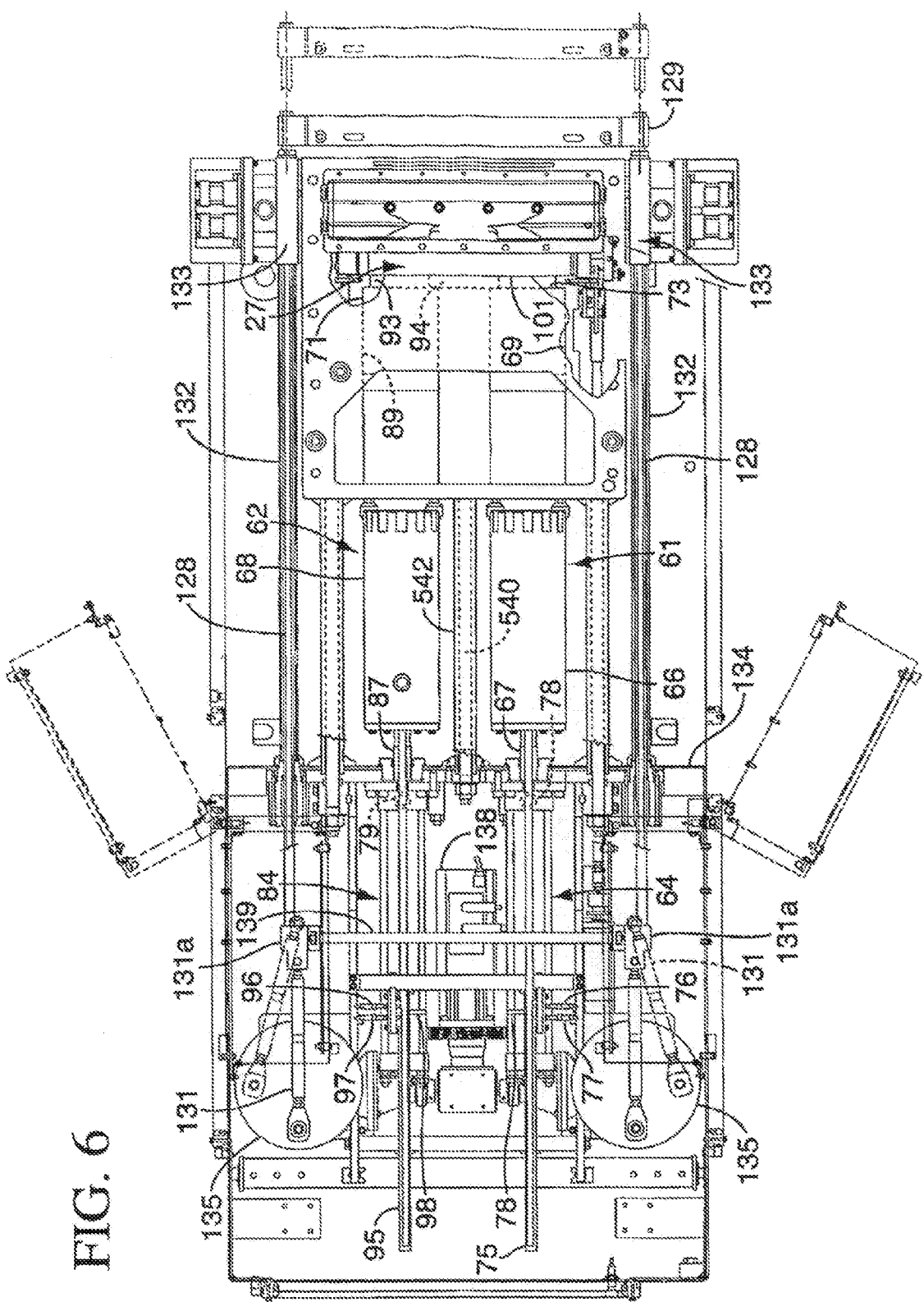
FIG. 6 is a sectional view taken generally along line 6-6 of FIG. 2, with some components and/or panels removed for clarity.
Figure 7:
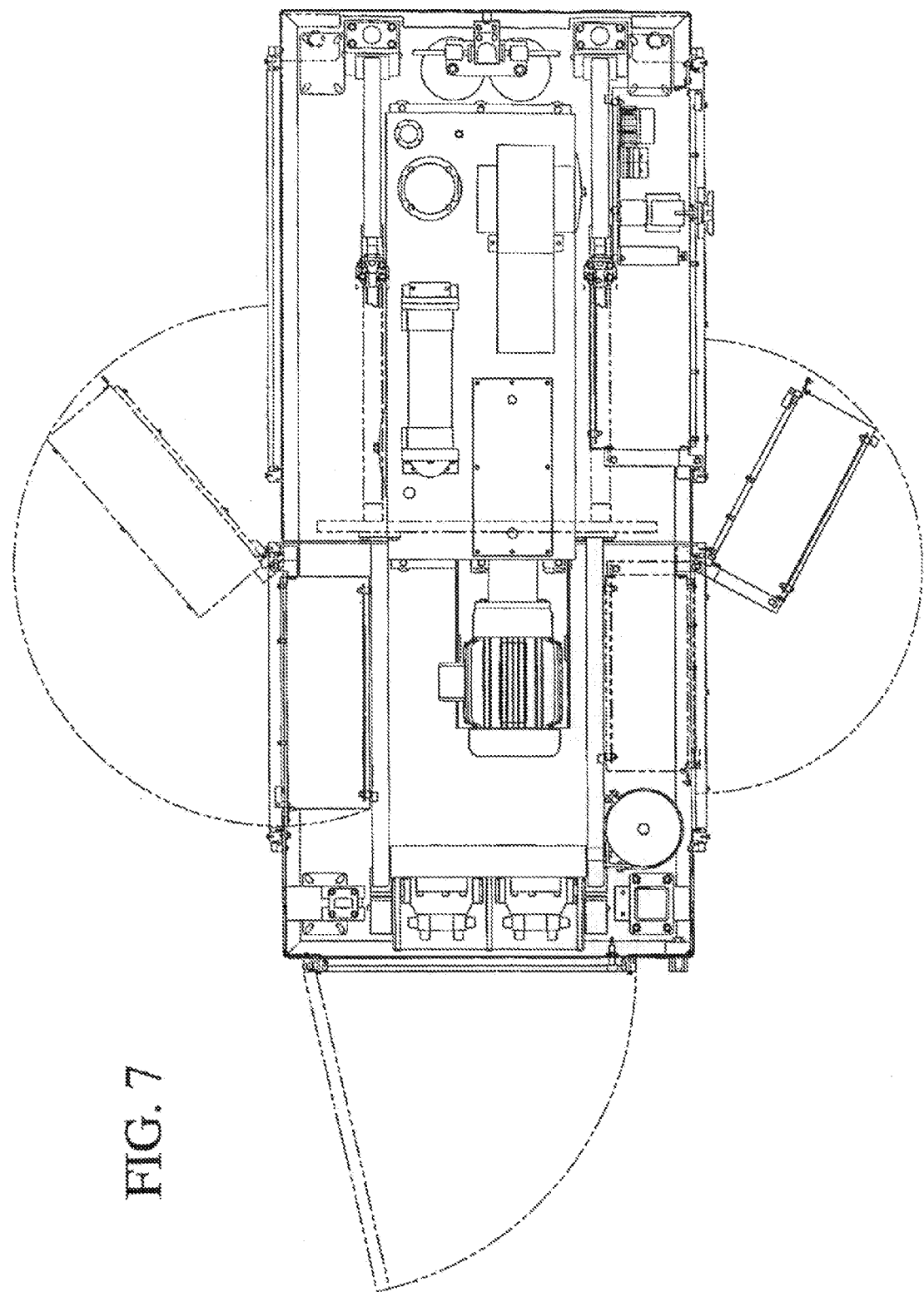
FIG. 7 is a sectional view taken generally along line 7-7 of FIG. 2, with some components and/or panels removed for clarity.
Figure 8:
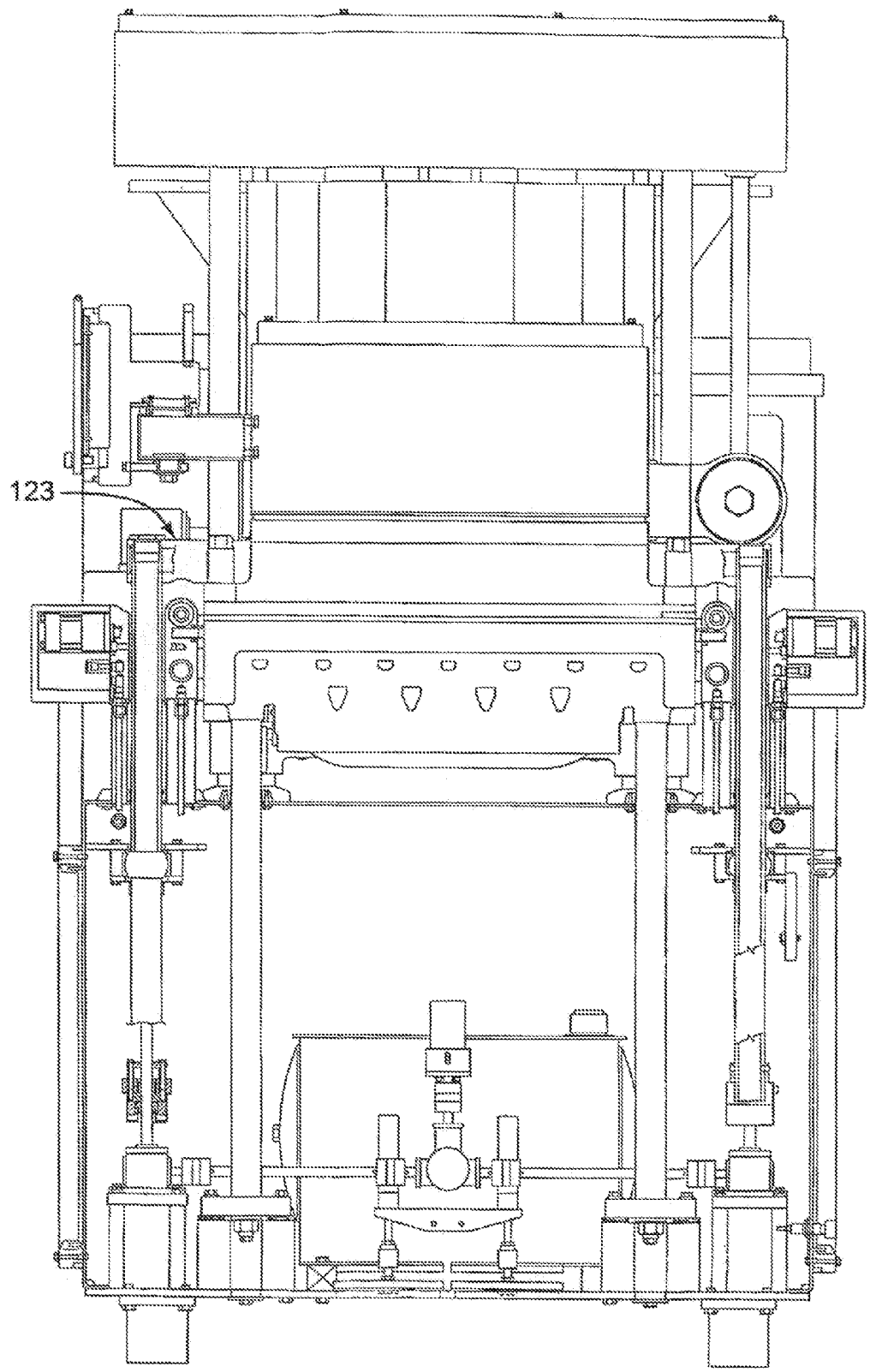
FIG. 8 is a sectional view taken generally along line 8-8 of FIG. 2, with some components and/or panels removed for clarity.

The food pump system 26 of molding machine 20 is best illustrated in FIGS. 2 and 6. Pump system 26 comprises the two reciprocating food pumps 61, 62 mounted on the machine base 21. The first food pump 61 includes a hydraulic cylinder 64. The piston in cylinder 64 (not shown) is connected to an elongated piston rod 67; the outer end of the elongated piston rod 67 is connected to the large plunger 66. The plunger 66 is aligned with a first pump cavity 69 formed by a pump cavity enclosure or housing 71 that is divided into two pump chambers. The forward wall 74 of pump cavity 69 has a relatively narrow slot 73 that communicates with the pump manifold 27 as described more fully hereinafter.

Preferably, the pump housing 71 and the valve manifold 27 are cast or otherwise formed as a one piece stainless steel part.

The second food pump 62 is essentially similar in construction to pump 61 and comprises a hydraulic cylinder 84. Cylinder 84 has an elongated piston rod 87 connected to the large plunger 68 that is aligned with a second pump cavity 89 in housing 71. The forward wall 94 of pump cavity 89 includes a narrow elongated slot 93 communicating with manifold 27.

Advantageously, the plungers 66, 68 and the pump cavities 69, 89 have corresponding round cross sections for ease of manufacturing and cleaning.

As shown in FIG. 6, an elongated proximity meter 75 is affixed to the first pump plunger 66 and extends parallel to piston rod 67 into alignment with a pair of proximity sensors 76 and 77. A similar proximity meter 95 is fixed to and projects from plunger 68, parallel to piston rod 87, in alignment with a pair of proximity sensors 96, 97. Proximity sensors 76, 77 and 96, 97 comprise a part of the control of the two pumps 61, 62.

The meters 75, 95 and sensors 76, 77, 96, 97 monitor the plunger positions in small, precise increments, such as every 0.25 inches. The meters include teeth or other targets that are sensed by the sensors and counted by machine electronics, such as in the machine controller, or in intervening electronics and communicated to the controller.

Two further proximity sensors 78, 98 responsive to targets on an inside facing surfaces of the meters 75, 95 respectively, are provided which communicate to the controller, or to intervening electronics that communicate with the controller, the home position of the respective plunger which corresponds to a front end of each plunger being just inside, and sealed by a front ring seal 99 (FIG. 2) to the pump housing 71. The home position of each plunger is used by the controller to calibrate or set the machine position control of the plungers 66, 86.

In operation, the first pump 61 pumps the moldable food material into manifold 27 and the second pump 62 receives a supply of the moldable food material for a subsequent pumping operation. Pump 61 begins its pumping stroke, and compresses food product in pump cavity 69, forcing the moldable food material through slot 73 into manifold 27. As operation of molding machine 20 continues, pump 61 advances plunger 66 to compensate for the removal of food material through manifold 27. The pump can maintain a constant pressure on the food material in the chamber 69 during the molding cycle, or preferably can provide a pre-selected pressure profile over the molding cycle such as described in U.S. Pat. No. 4,356,595, incorporated herein by reference, or as utilized in currently available FORMAX machines. The pressure applied through pump 61 is sensed by a pressure sensing switch 78 connected to a port of the cylinder 64.

As plunger 66 advances, the corresponding movement of proximity meter 75 signals the sensor 76, indicating that plunger 66 is near the end of its permitted range of travel. When this occurs, pump 62 is actuated to advance plunger 68 through pump cavity 89, compressing the food material in the second pump cavity in preparation for feeding the food material from the cavity into manifold 27. The pressure applied through pump 62 is sensed by a pressure sensing switch 79 connected to one port of cylinder 84.

When the food in the second pump cavity 89 is under adequate pressure, the input to manifold 27 is modified so that subsequent feeding of food product to the manifold is effected from the second pump cavity 89 with continuing advancement of plunger 68 of the second pump 62. After the manifold intake has been changed over, pump 61 is actuated to withdraw plunger 66 from cavity 69.

Thereafter, when plunger 68 is near the end of its pressure stroke into pump cavity 89, proximity sensor 96, signals the need to transfer pumping operations to pump 61. The changeover process described immediately above is reversed; pump 61 begins its compression stroke, manifold 27 is changed over for intake from pump 61, and pump 62 subsequently retracts plunger 68 back to the supply position to allow a refill of pump cavity 89. This overlapping alternating operation of the two pumps 61, 62 continues as long as molding machine 20 is in operation.

The pump feed manifold 27, shown in FIGS. 2 and 6, holds a manifold valve cylinder or tube valve 101 fit into an opening 102 in housing 71 immediately beyond the pump cavity walls 74 and 94.

According to the illustrated embodiment, valve cylinder 101 includes two longitudinally displaced intake slots 107 and 108 alignable with the outlet slots 73 and 93, respectively, in the pump cavity walls 74 and 94. Slots 107 and 108 are angularly displaced from each other to preclude simultaneous communication between the manifold and both pump cavities 69 and 89. Cylinder 101 also includes an elongated outlet slot 109. The valve cylinder outlet slot 109 is generally aligned with a slot 111 (see FIG. 9A) in housing 71 that constitutes a feed passage for molding mechanism 28.

One end wall of valve cylinder 101 includes an externally projecting base end 103 that is connected to a drive linkage 104, in turn connected to the end of the piston rod 105 of a hydraulic actuator cylinder 106 (FIG. 2).

When the pump 61 is supplying food material under pressure to molding mechanism 28, actuator cylinder 106 has retracted piston rod 105 to the inner limit of its travel, angularly orienting the manifold valve cylinder 101. With cylinder 101 in this position, its intake slot 107 is aligned with the outlet slot 73 from pump cavity 69 so that food material is forced under pressure from cavity 69 through the interior of valve cylinder 101 and out of the valve cylinder outlet slot 109 through slot 111 to the molding mechanism 27. On the other hand, the second intake slot 108 of valve cylinder 101 is displaced from the outlet slot 93 for the second pump cavity 89. Consequently, the food material forced into the interior of valve cylinder 101 from pump cavity 69 cannot flow back into the other pump cavity 89.

The valve cylinder 101 and corresponding slots or openings can alternately be as described in U.S. Provisional Application 60/571,368, filed May 14, 2004, or U.S. Ser. No. 10/942,754 now U.S. Pat. No. 7,125,245, filed on the same day as the present invention, both herein incorporated by reference. According to these disclosures, rather than a single outlet 109, two rows of progressively sized outlets, smallest closest to the active pump, are alternately opened to plural openings that replace the single opening 111.

Molding Mechanism

Figure 9A:
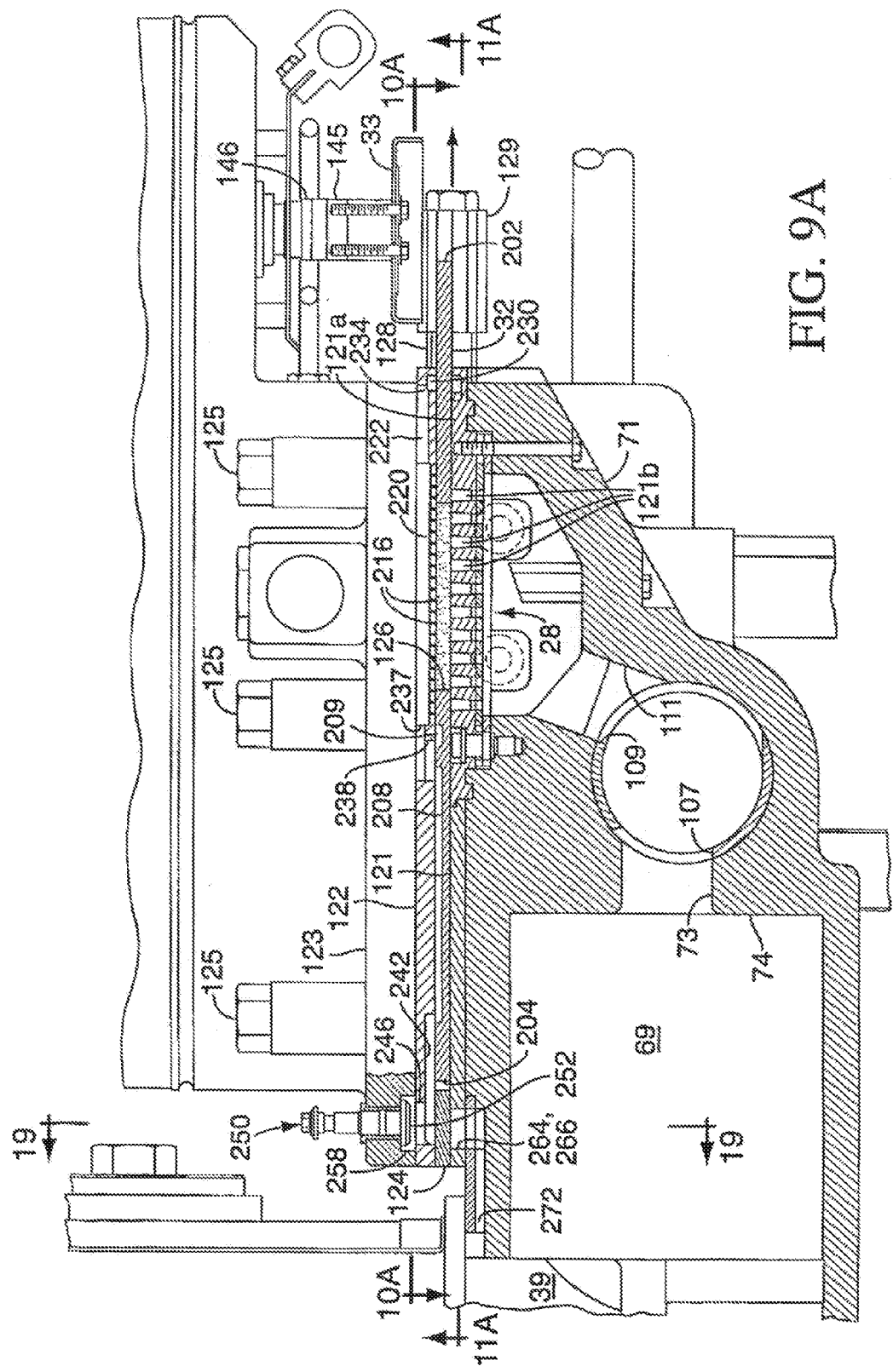

As best illustrated in FIG. 9A, the upper surface of the housing 71 that encloses the pump cavities 69 and 89 and the manifold 27 carries a support plate or wear plate 121 and a fill plate 121a that forms a flat, smooth mold plate support surface. The mold support plate 121 and the fill plate 121a may be fabricated as two plates as shown or a single plate bolted to or otherwise fixedly mounted upon housing 71. The fill plate 121a includes apertures or slots that form the upper portion of the manifold outlet passage 111. In the apparatus illustrated, a multi fill orifice type fill plate 121a is utilized. A simple slotted fill plate is also encompassed by the invention.

Mold plate 32 is supported upon plates 121, 121a. Mold plate 32 includes a plurality of individual mold cavities 126 extending across the width of the mold plate and alignable with the manifold outlet passageway 111. Although a single row of cavities is shown, it is also encompassed by the invention to provide plural rows of cavities, stacked in aligned columns or in staggered columns. A cover plate 122 is disposed immediately above mold plate 32, closing off the top of each of the mold cavities 126. A mold cover casting or housing 123 is mounted upon cover plate 122. The spacing between cover plate 122 and support plate 121 is maintained equal to the thickness of mold plate 32 by support spacers 124 mounted upon support plate 121. Cover plate 122 rests upon spacers 124 when the molding mechanism is assembled for operation. Cover plate 122 and mold cover casting are held in place by six mounting bolts, or nuts tightened on studs, 125.

A mold plate drive system is described in U.S. Ser. No. 10/942,805, and filed on the same day as the present application, and herein incorporated by reference.

Figure 3:
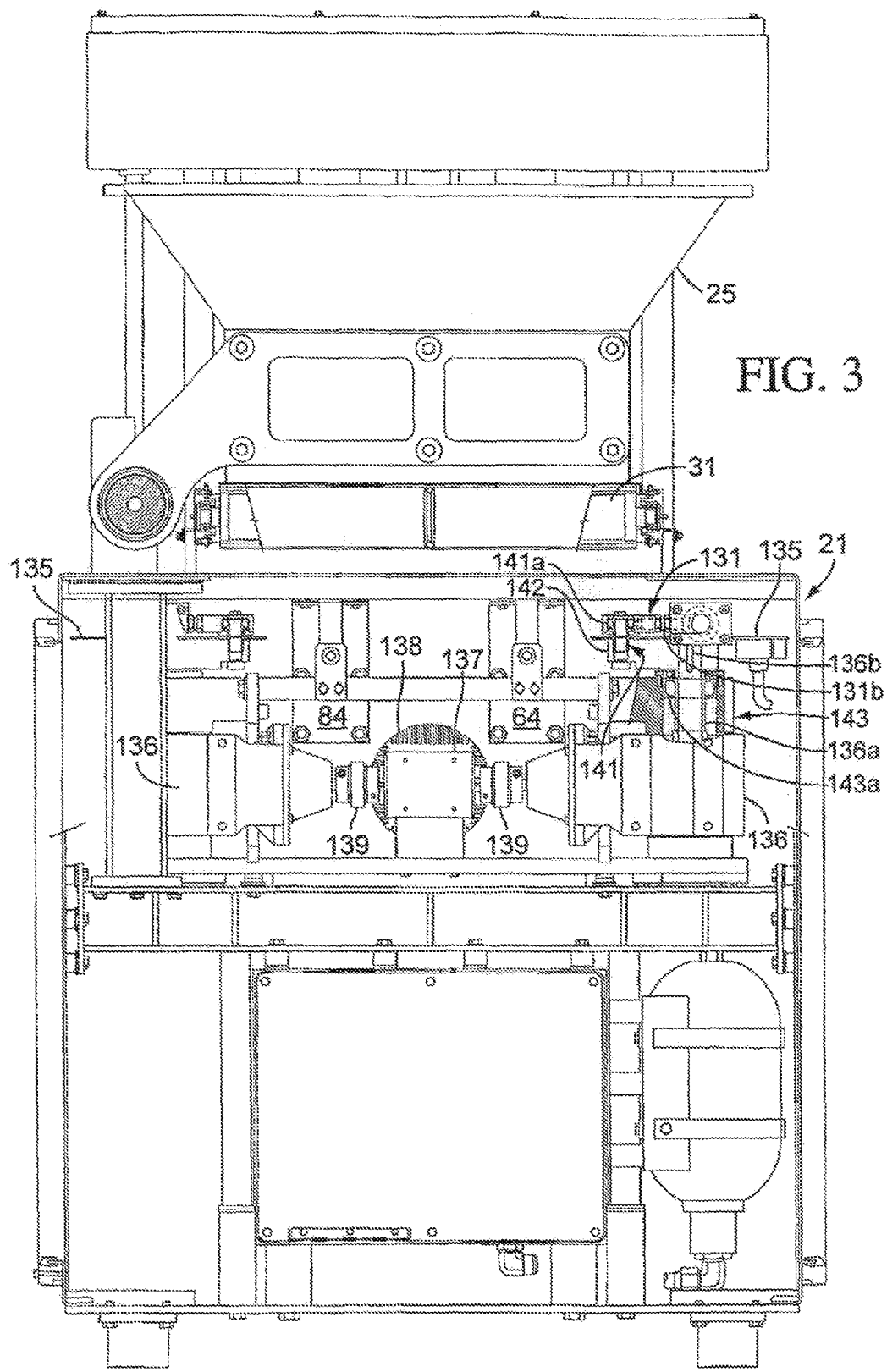
FIG. 3 is a sectional view taken generally along line 3-3 of FIG. 2, with some components and/or panels removed for clarity.
Figure 4:
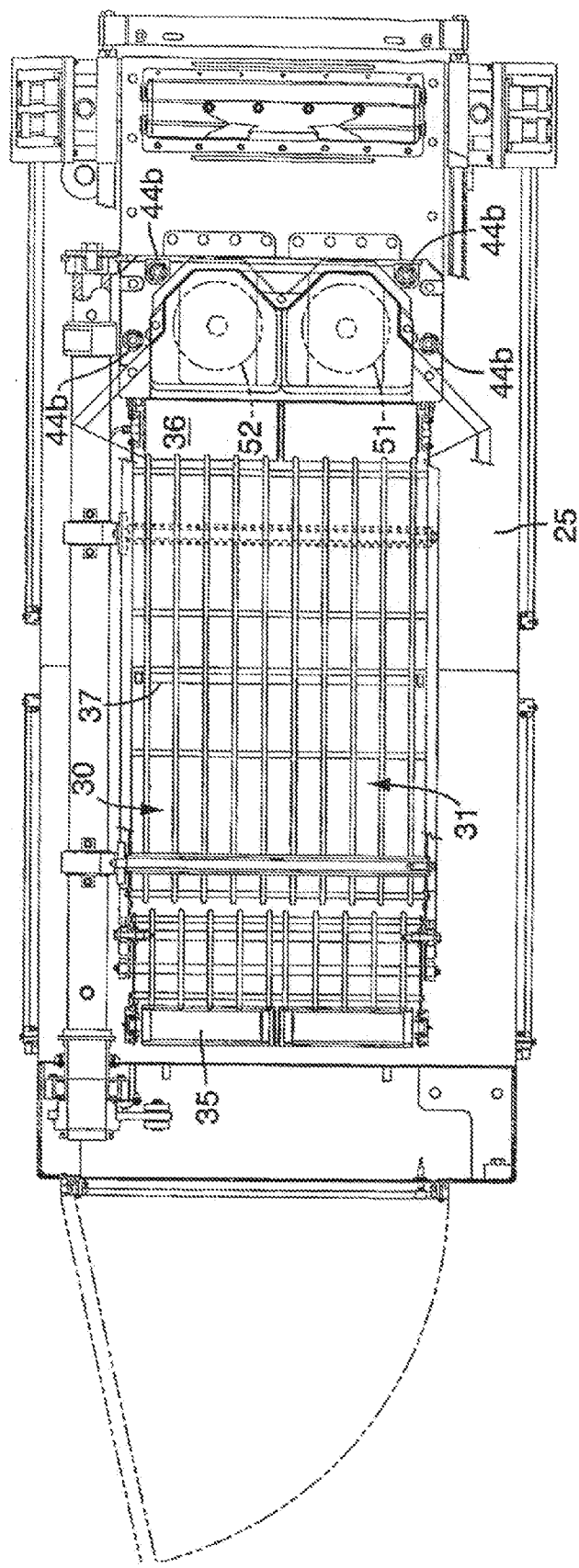
FIG. 4 is a sectional view taken generally along line 4-4 of FIG. 2, with some components and/or panels removed for clarity.

As best illustrated in FIGS. 3 and 6 mold plate 32 is connected to drive rods 128 that extend alongside housing 71 and are connected at one end to a transverse bar 129. The other end of each drive rod 128 is pivotally connected to a connecting link 131 via a coupling plate 131a and a pivot connection 131c, shown in FIG. 2. The pivot connection 131c can include a bearing (not visible in the figures) surrounding a pin within an apertured end of the connecting link 131. The pin includes a cap, or carries a threaded nut, on each opposite end to secure the crank arm to the coupling plate 131a.

Each drive rod 128 is carried within a guide tube 132 that is fixed between a wall 134 and a front bearing housing 133. The connecting links 131 are each pivotally connected to a crank arm 142 via a pin 141 that is journaled by a bearing 141a that is fit within an end portion of the connecting link 131. The pin crank arm 142 is fixed to, and rotates with, a circular guard plate 135. The pin 141 has a cap, or carries a threaded nut, on each opposite end that axially fixes the connecting link 131 to the crank arm 142 and the circular guard plate 135. The connecting link 131 also includes a threaded portion 131b to finely adjust the connecting link length.

The crank arms 142 are each driven by a right angle gear box 136 via a "T" gear box 137 having one input that is driven by a precise position controlled motor 138 and two outputs to the gearboxes 136. The "T" gear box 137 and the right angle gear boxes 136 are configured such that the crank arms 142 rotate in opposite directions at the same rotary speed.

The precise position controlled motor can be a 6-7.5 HP totally enclosed fan cooled servo motor. The servo motor is provided with two modules: a power amplifier that drives the servo motor, and a servo controller that communicates precise position information to the machine controller 23.

The controller 23 and the servo motor 138 are preferably configured such that the servo motor rotates in an opposite rotary direction every cycle, i.e., clockwise during one cycle, counterclockwise the next cycle, clockwise the next cycle, etc.

A bearing housing 143 is supported on each gearbox 136 and includes a rotary bearing 143a therein to journal an output shaft 136a of the gear box 136. The output shaft 136a is fixed to the crank arm 142 by a clamp arrangement formed by legs of the crank arm 142 that surround the output shaft and have fasteners that draw the legs together to clamp the output shaft between the legs (not shown), and a longitudinal key (not shown) fit into a keyway 136b on the output shaft and a corresponding keyway in the crank arm 142 (not shown).

A tie bar 139 is connected between the rods 128 to ensure a parallel reciprocation of the rods 128. As the crank arms 142 rotate in opposite rotational directions, the outward centrifugal force caused by the rotation of the crank arms 142 and the eccentric weight of the attached links 131 cancels, and separation force is taken up by tension in the tie bar 139.

One circular guard plate 135 is fastened on top of each crank arm 142. The pin 141 can act as a shear pin. If the mold plate should strike a hard obstruction, the shear pin can shear by force of the crank arm 142. The guard plate 135 prevents an end of the link 131 from dropping into the path of the crank arm 142.

During a molding operation, the molding mechanism 28 is assembled as shown in FIGS. 2 and 9A, with cover plate 122 tightly clamped onto spacers 124.

The knockout cups 33 are driven by a knockout drive mechanism as described in U.S. Ser. No. 10/942,809, filed on the same day as the present application, and herein incorporated by reference.

Figure 9D:
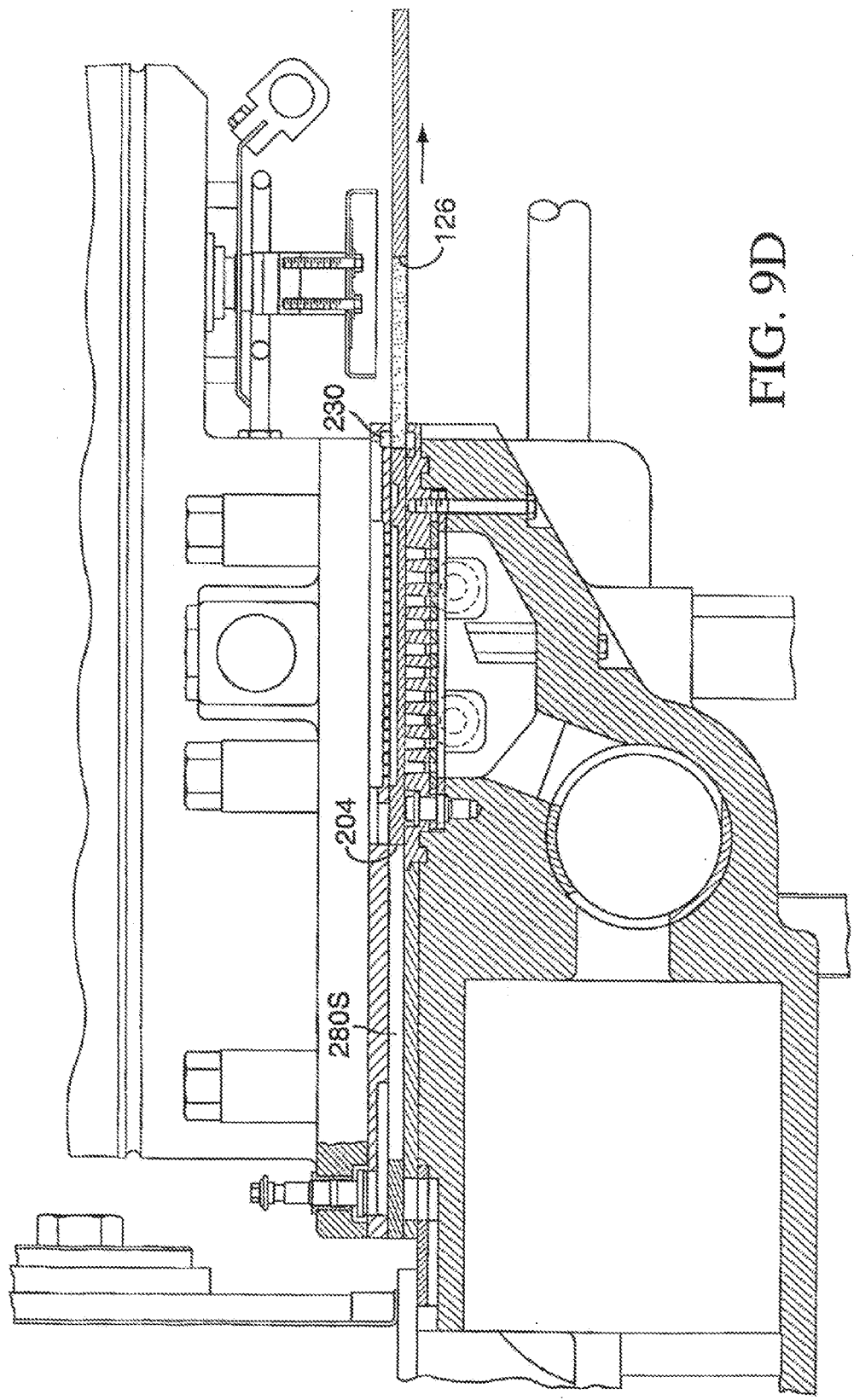
Figure 9E:
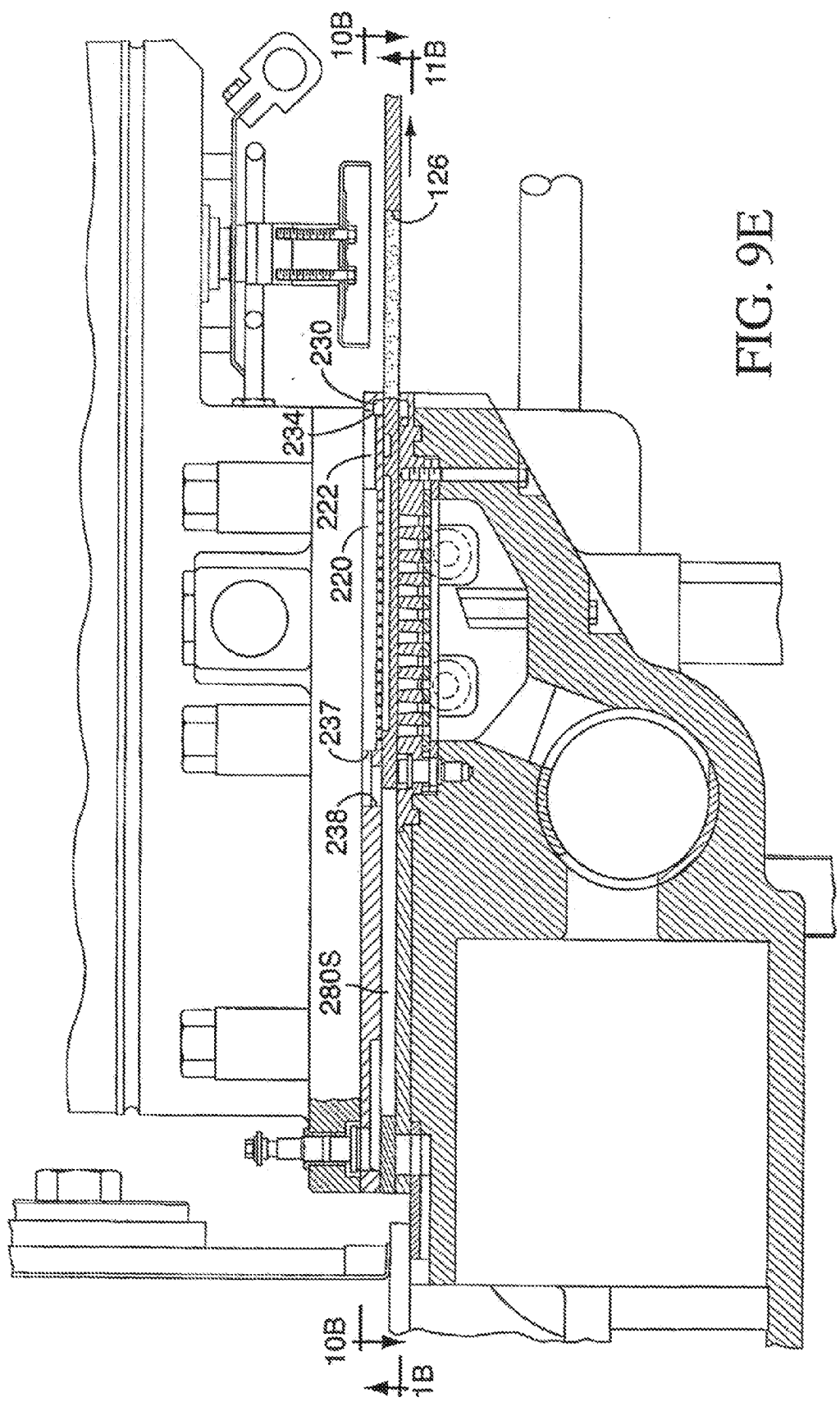
Figure 9F:
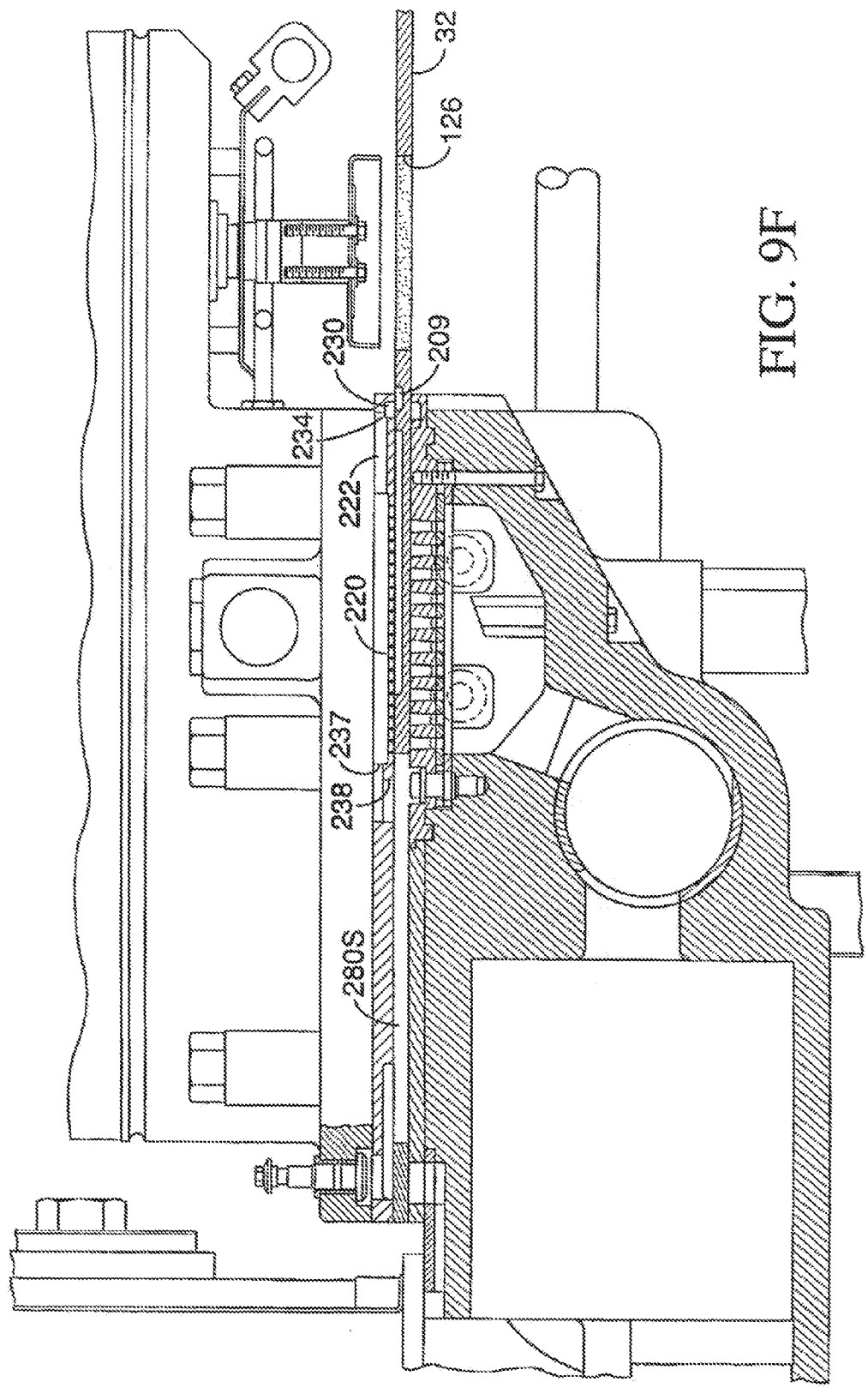

In each cycle of operation, knockout cups 33 are first withdrawn to the elevated position as shown in FIG. 9F. The drive for mold plate 32 then slides the mold plate from the full extended position to the mold filling position illustrated in FIGS. 2 and 9A, with the mold cavities 126 aligned with passageway 111.

During most of each cycle of operation of mold plate 32, the knockout mechanism remains in the elevated position, shown in FIG. 9A, with knockout cups 33 clear of mold plate 32. When mold plate 32 reaches its extended discharge position as shown in FIG. 9F the knockout cups 33 are driven downward to discharge the patties from the mold cavities.

The discharged patties may be picked up by the conveyor 29 or may be accumulated in a stacker. If desired, the discharged patties may be interleaved with paper, by an appropriate paper interleaving device. Such a device is disclosed in U.S. Pat. No. 3,952,478, or U.S. Ser. No. 60/540,022, filed on Jan. 27, 2004, both incorporated herein by reference. In fact, machine 20 may be used with a wide variety of secondary equipment, including steak folders, bird rollers, and other such equipment.

By using a servo motor to drive the mold plate, the mold plate motion can be precisely controlled. The motion can have a fully programmable dwell, fill time, and advance and retract speeds.

Auxiliary Pump System for Air and Fines From the Breather System

FIG. 9A through 12 illustrate another aspect of the invention. According to this aspect, the mold plate 32 includes two ends, a forward end 202 and a rearward end 204. The cavities 126 are located at a central position between the ends 202, 204. Elongated connection recesses 208 are located at a rearward position, near the rearward end 204. Relief recesses 209 are located between the connection recesses 208 and the cavities 126. In FIG. 9A the mold plate 32 is in a fill position, fully retracted toward the rear. The cover plate or breather plate 122 includes breather holes 216 that are in air communication with the cavities 126 while the mold plate is in the fill position.

The holes 216 are in communication with a top side air channel in the form of a dished region 220 of the cover plate 122. The dished region 220 includes branch regions 222 that extend forwardly. The branch regions 222 are in air communication with an antilip channel 230 open on a bottom side of the cover plate 122, through narrow apertures 234.

On a rearward portion of the dished region 220 are recesses 237 that are in communication with through holes 238 that extend through the thickness of the cover plate 122. In the mold plate position of FIG. 9A, the through holes 238 are open into the elongated connection recesses 208.

On a rearward portion of the cover plate 122 is a bottom side recess 242 that is in communication with an overhead valve passage 246 that can be closed by action of a valve 250, particularly by action of a valve element 252 of the valve 250. The valve element 252 is in the open position as shown in FIG. 9A. The valve element is movable within a valve chamber 258 formed into a bottom side of the mold cover 123.

The valve chamber 258 extends laterally and is flow connected to two through bores 264, 266 that each extend through the cover plate 122, the spacer 124, the top plate 121, and an insert plate 270 fit on a recess 272 of the pump casing 71. The recess 272 is open into the pump inlet 39.

In the position shown in FIG. 9A, the cavities are filled through a plurality of fill apertures or slots 121b through fill plate 121a (see FIG. 41 as an example of fill apertures) fastened to the manifold 27. The mold plate 32 is beginning its forward travel, driven by the drive rods 128 via the link 129. The valve element 252 is up; the valve 250 is open.

As illustrated in FIG. 9B, when the connection recess 208 is no longer in communication with the bottom side recess 242, the moving end 204 of the plate 32 creates a suction chamber 280S formed between the spacer 124, the end 204, the breather plate 122 and the top plate 121. The element 252 is drawn down by the suction to close the valve passage 246.

In the position of the mold plate shown in FIG. 9C, the cavities 126 have moved into a position to be relieved in pressure by the antilip slot 230, any expansion of the patties is cut as the patties pass under the antilip bar 231. Further suction is drawn in the chamber 280 by movement of the end 204.

As shown in FIG. 9D, maximum suction is developed at this point in the chamber 280S by movement of the end 204.

As shown in FIG. 9E, the end 204 has passed under the through hole 238. The suction chamber 280 draws air and meat fines from the chambers and recesses 230, 234, 222, 220, 237, 238 into the suction chamber 280S.

FIG. 9F illustrates the mold plate 32 in its discharge position. The relief recesses 209 open the antilip channel 230 to outside air. Outside air flushes through the series of recesses and other passages identified as 209, 230, 234, 222, 220, 237, and 238 and into the suction chamber 280S under influence of a vacuum present in the suction chamber 280S. The pressure in the suction chamber 280S and the connected chambers and passages 238, 237, 220, 222, 234, 230 is increased to atmospheric pressure. The valve element 252 is then elevated and the valve 250 is then open.

Figure 9G:
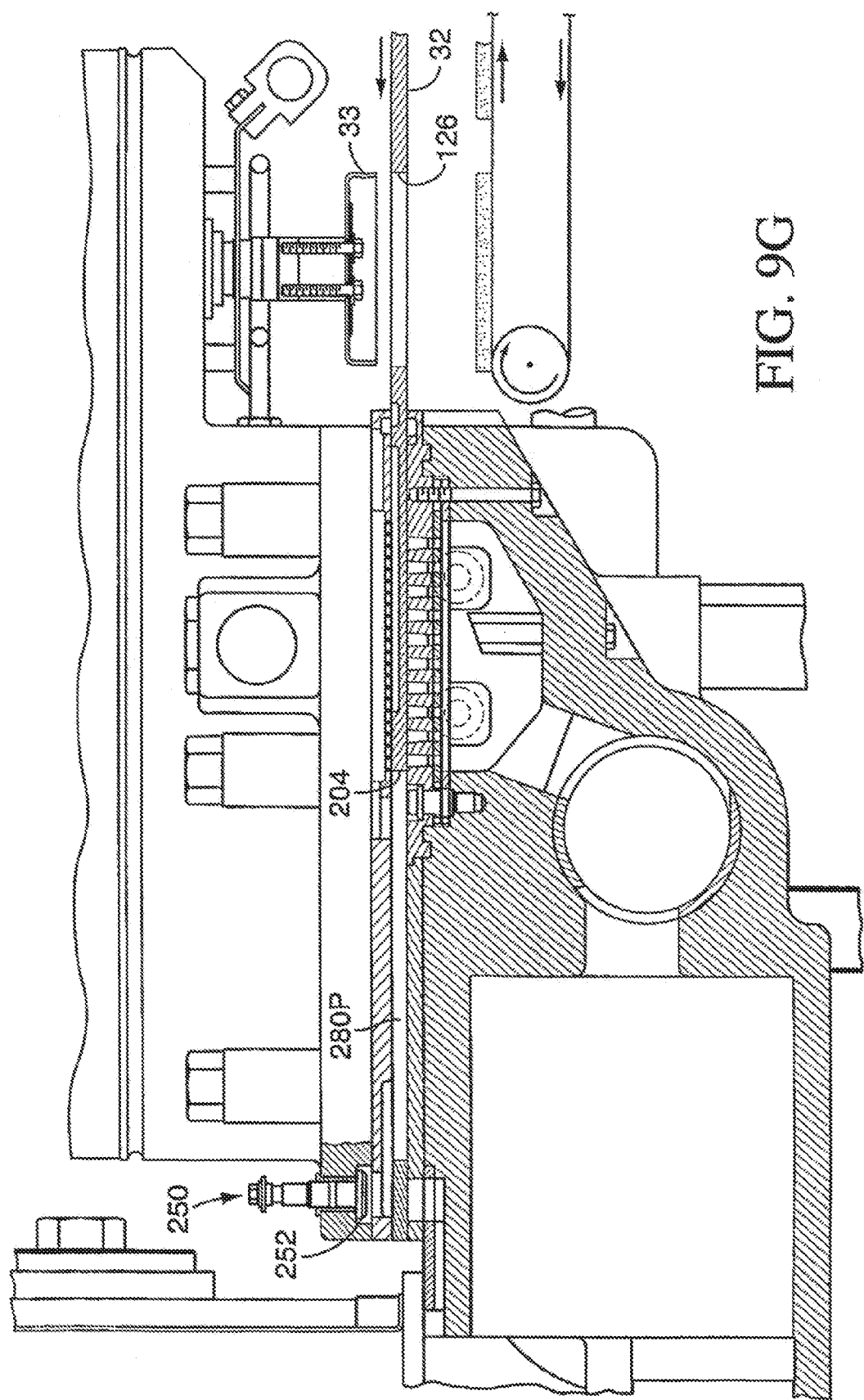

FIG. 9G illustrates the patty has been discharged by downward movement of the cup 33, which subsequently has been elevated. The patty has been deposited onto the conveyor. The mold plate 32 begins a rearward movement. The suction chamber 280 now becomes a compression or pump chamber 280P. Any air or meat fines drawn into the suction chamber 280S can now be transported by positive pressure or pumping action of the pump chamber 280P through the open valve 250 and into the pump inlet 39 as now described.

Figure 9H:
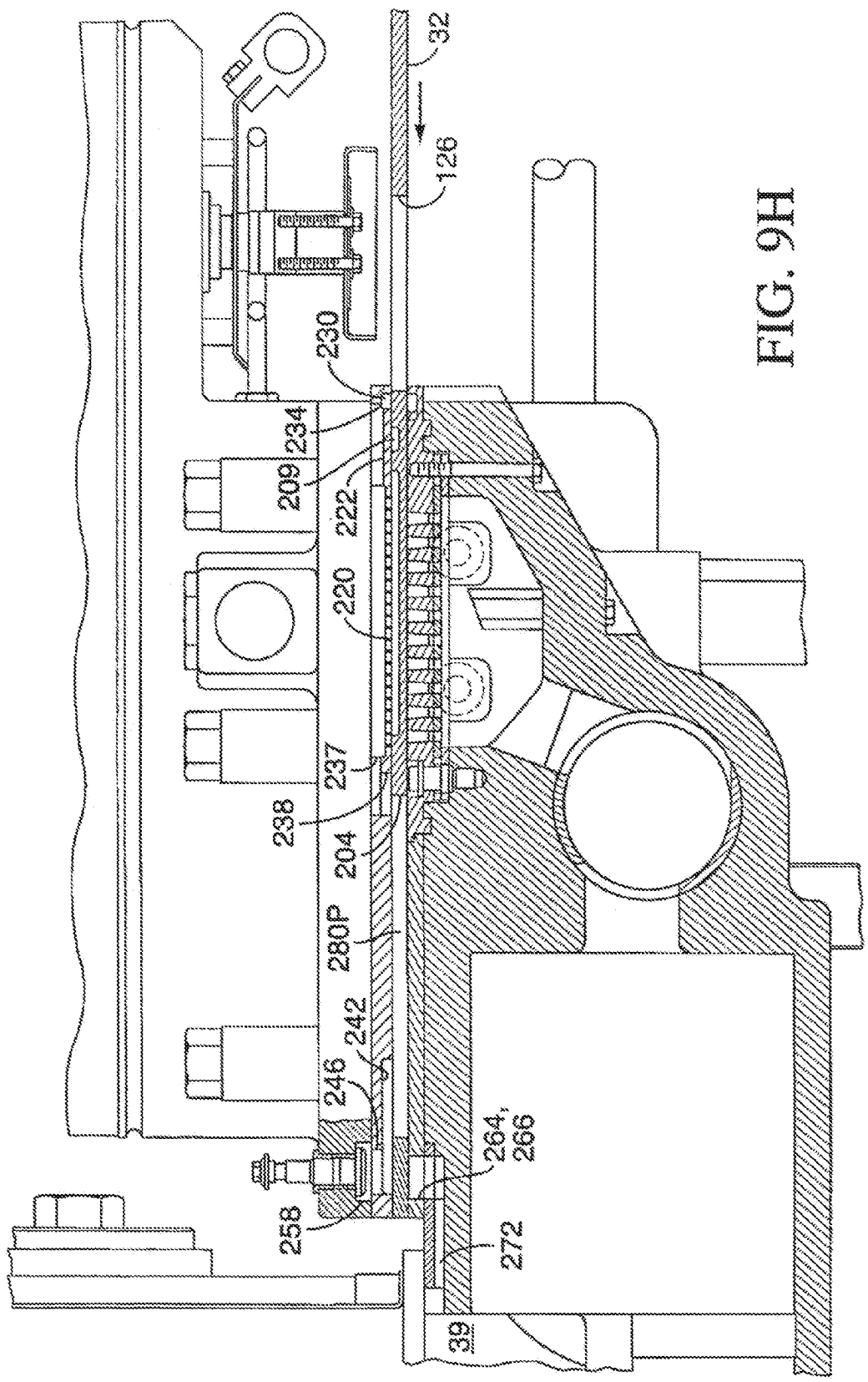

FIG. 9H illustrates that for a brief time during the return stroke of the mold plate, the mold plate moved a small amount to the left of the position shown in FIG. 9H, the moving end 204 will pump air rearward through the pump chamber 280P and forward through the passages 238, 237, 220, 222, 234, 230, 126 to outside air. However the latter forward path is more restrictive than the rearward path so little flows in this direction. Most air and fines are pumped through the chamber 280P, through the recess 242, through the valve passage 246, through the recess 258, through the bores 264 and 266, through the recess 272 and into the pump inlet 39.

Figure 9I:
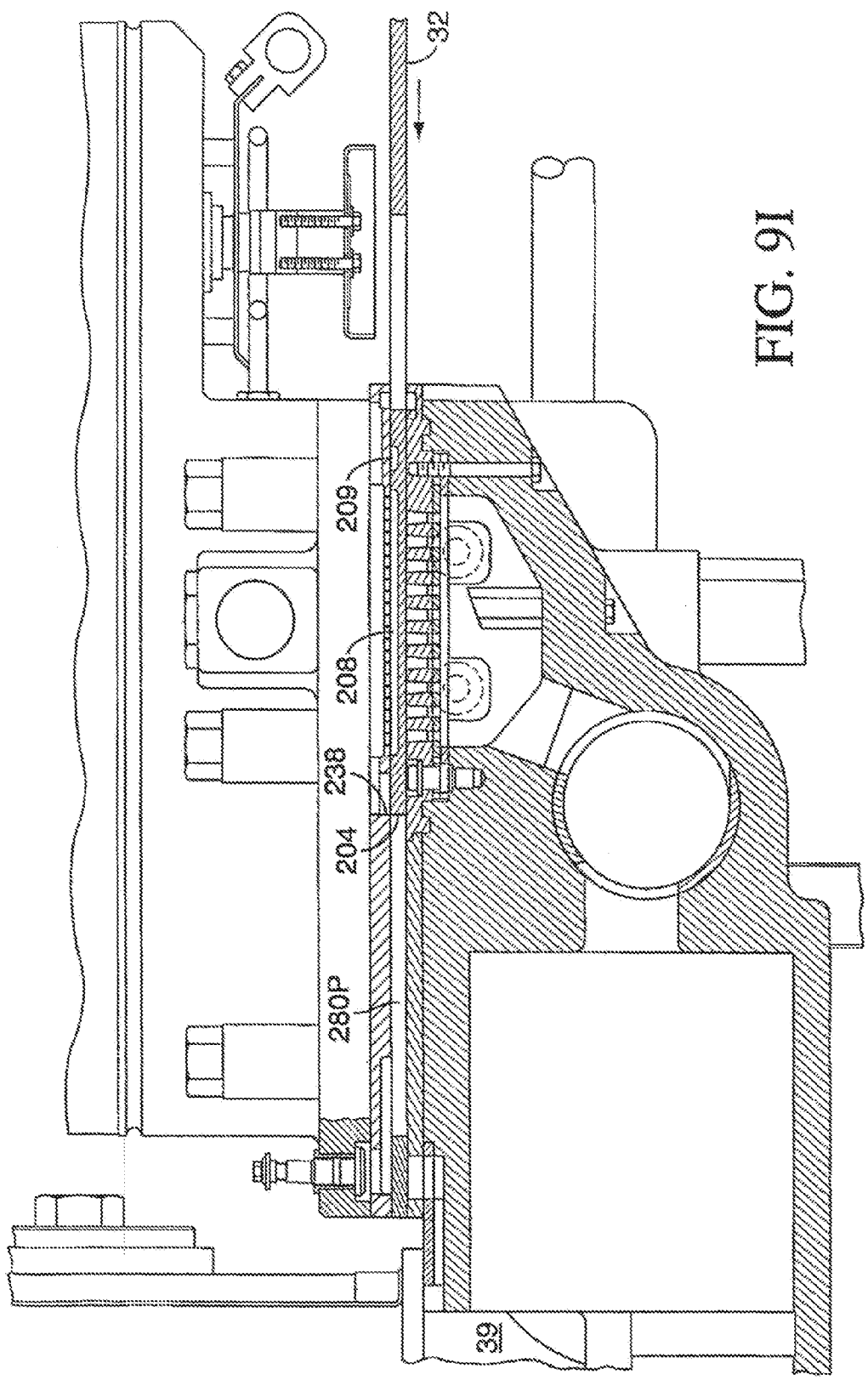

FIG. 9I illustrates that the end 204 has passed the passage 238 and thus all of the air and fines in the pump chamber 280P must pass rearward toward the pump inlet 39.

FIG. 9J illustrates the cavities 126 become open to the fill slots 121b of the fill plate 121a wherein the cavities begin to fill with meat under pressure. The pump chamber is continuously reduced in volume as the end 204 proceeds rearward. The valve 250 is still open.

Figure 9K:
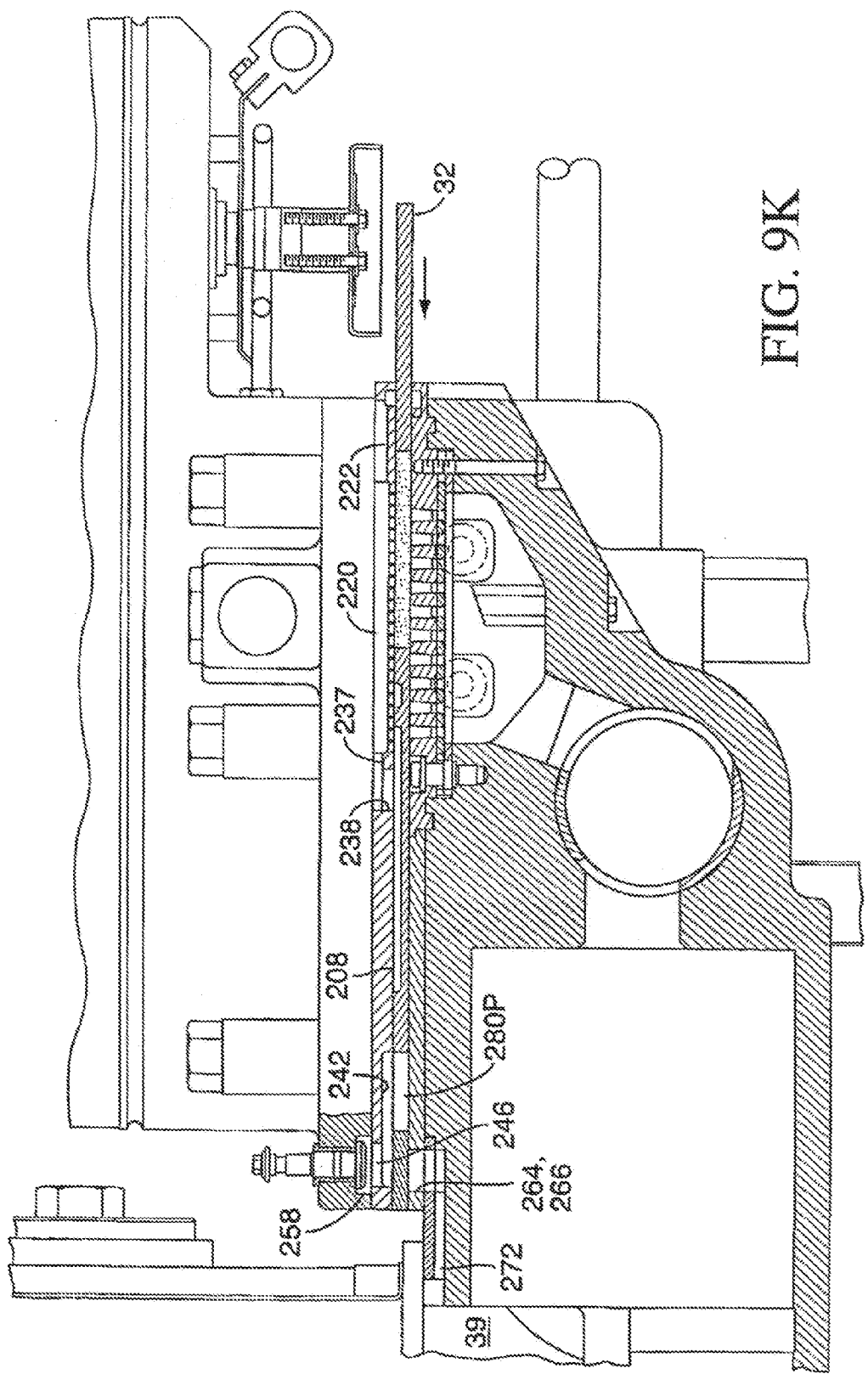
Figure 10A:
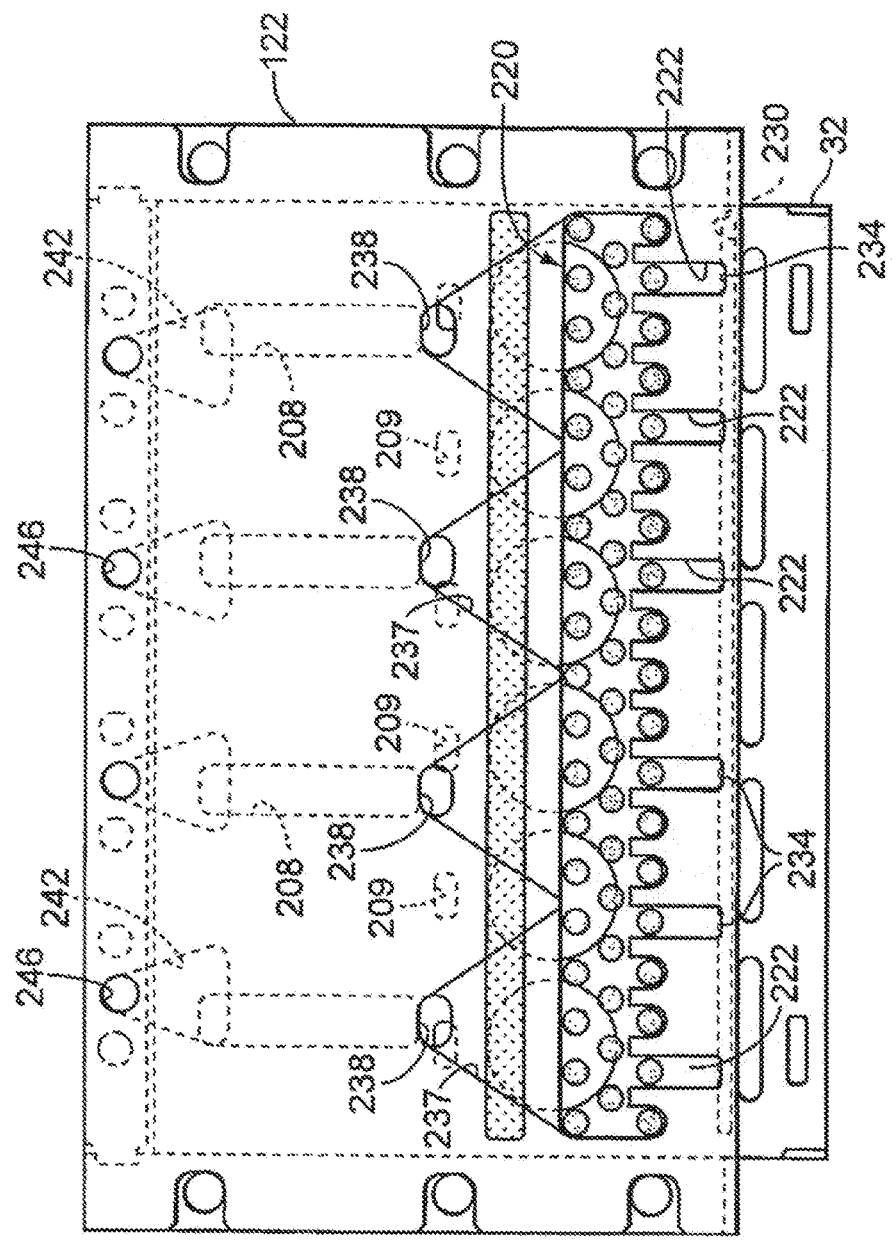
FIG. 10A is a fragmentary sectional view taken generally along line 10A-10A of FIG. 9A.
Figure 10B:
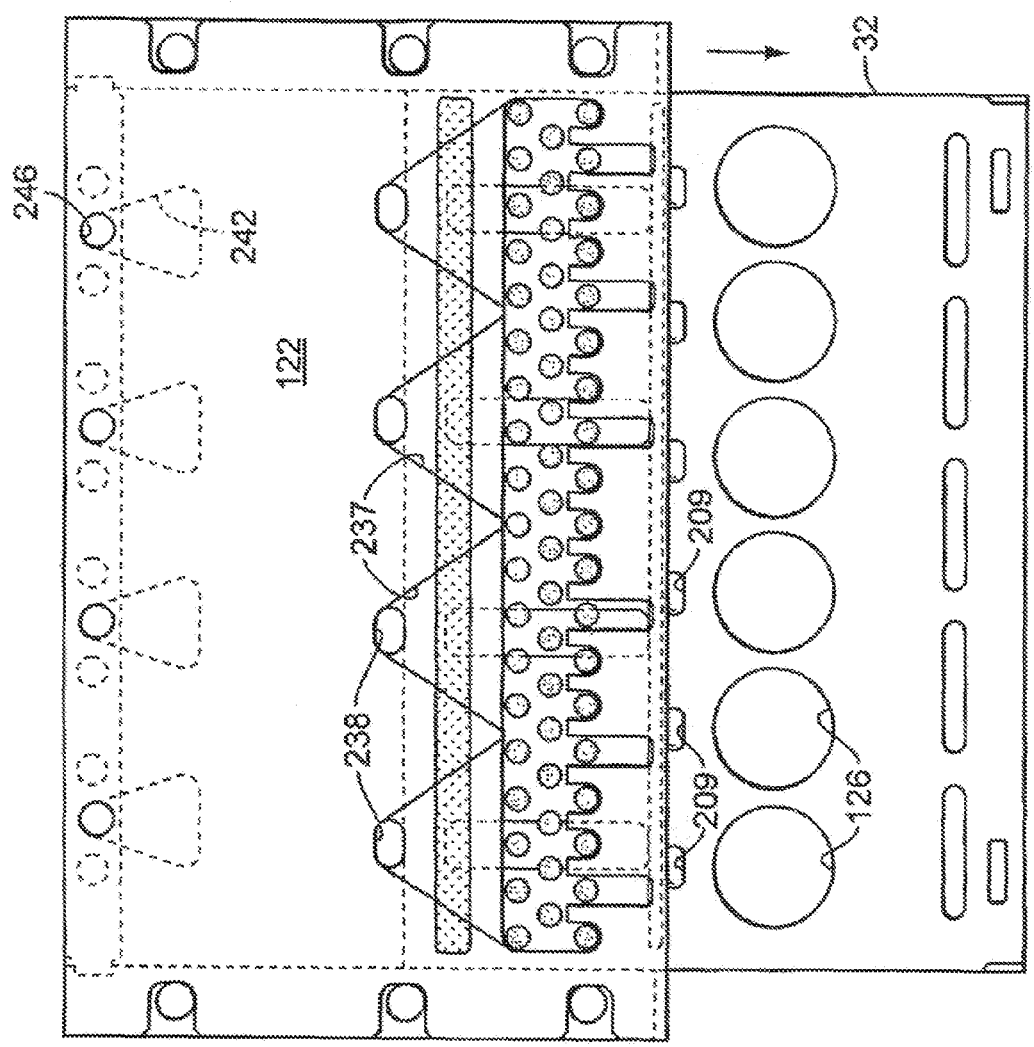
FIG. 10B is a fragmentary sectional view taken generally along line 10B-10B of FIG. 9E.
Figure 11A:
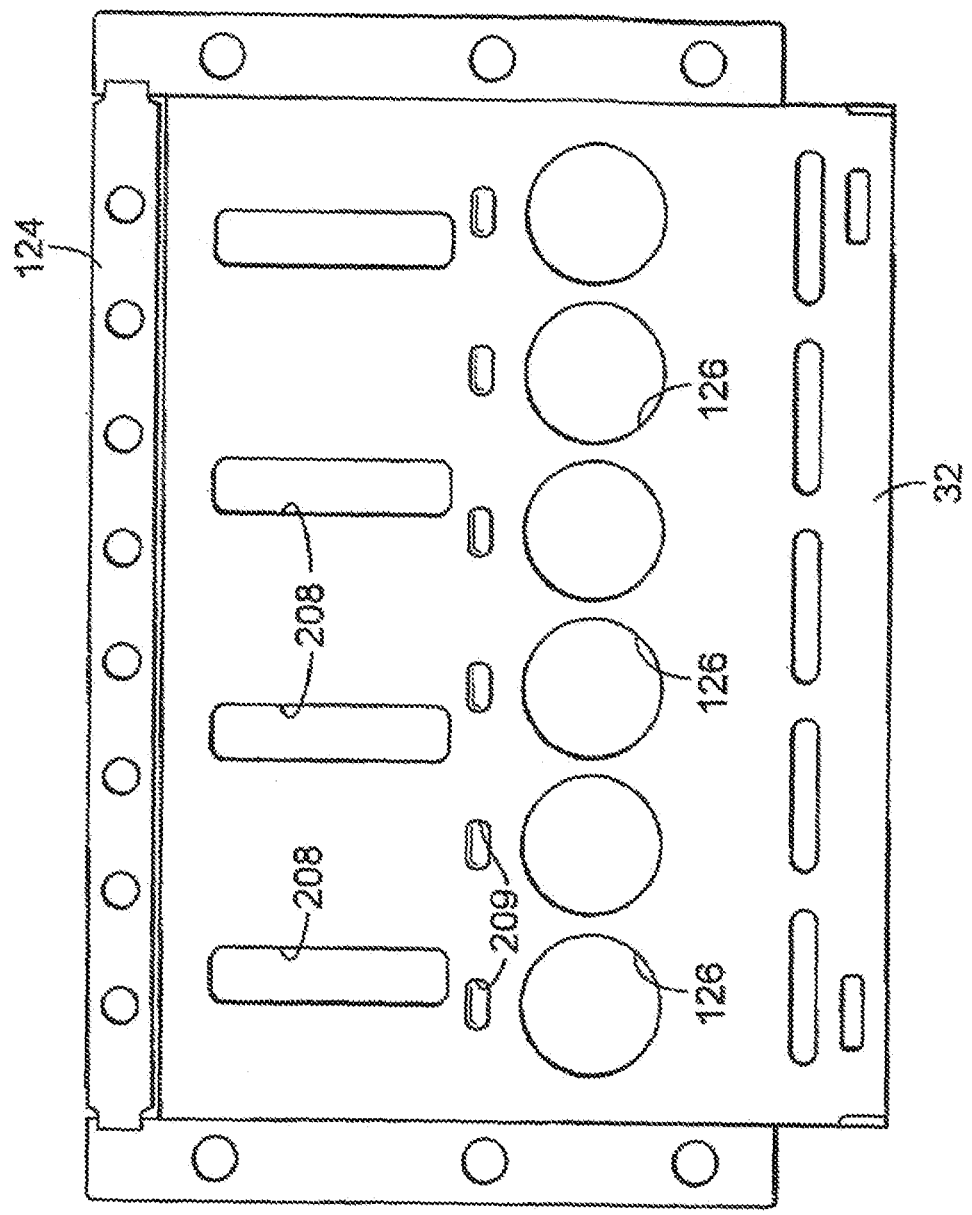
FIG. 11A is a fragmentary sectional view taken generally along line 11A-11A of FIG. 9A, with some components and/or panels removed for clarity.
Figure 11B:
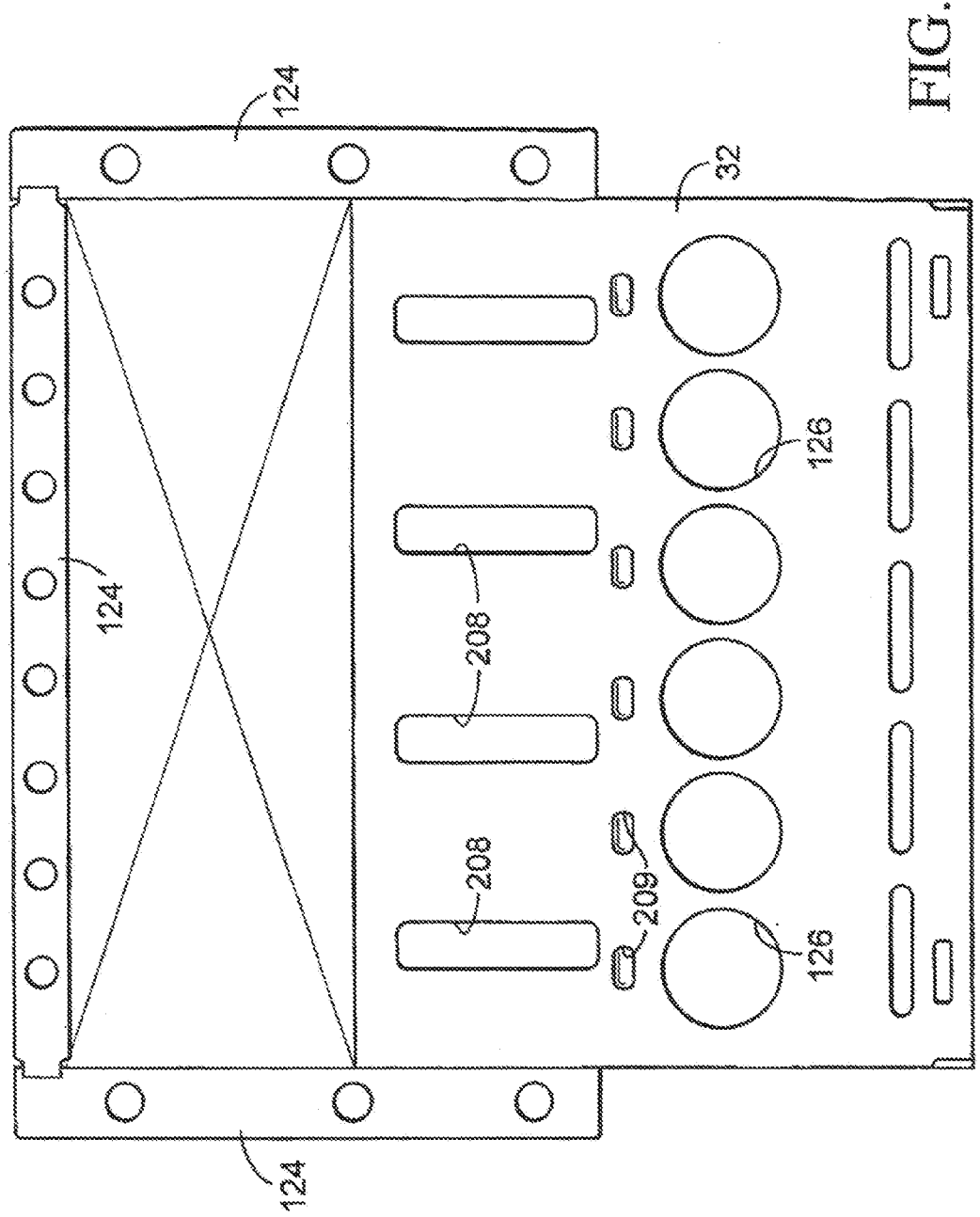
FIG. 11B is a fragmentary sectional view taken generally along line 11B-11B of FIG. 9E, with some components and/or panels removed for clarity.

FIG. 9K illustrates a late stage of movement of the mold plate 32. The cavities 126 are continuing to be filled. The meat, under pressure forces air and meat fines through the apertures 216 into the chambers 220, 222, 237, 238, 208. The valve 250 remains open wherein the mold plate reaches the position of FIG. 9A, the air and meat fines can exit the chambers 220, 222, 237, 238, 208 by virtue of the recess 208 being in air flow communication with the recess 242 and the passages 246, 258, 264, 266, 272 and 39.

Figure 13:
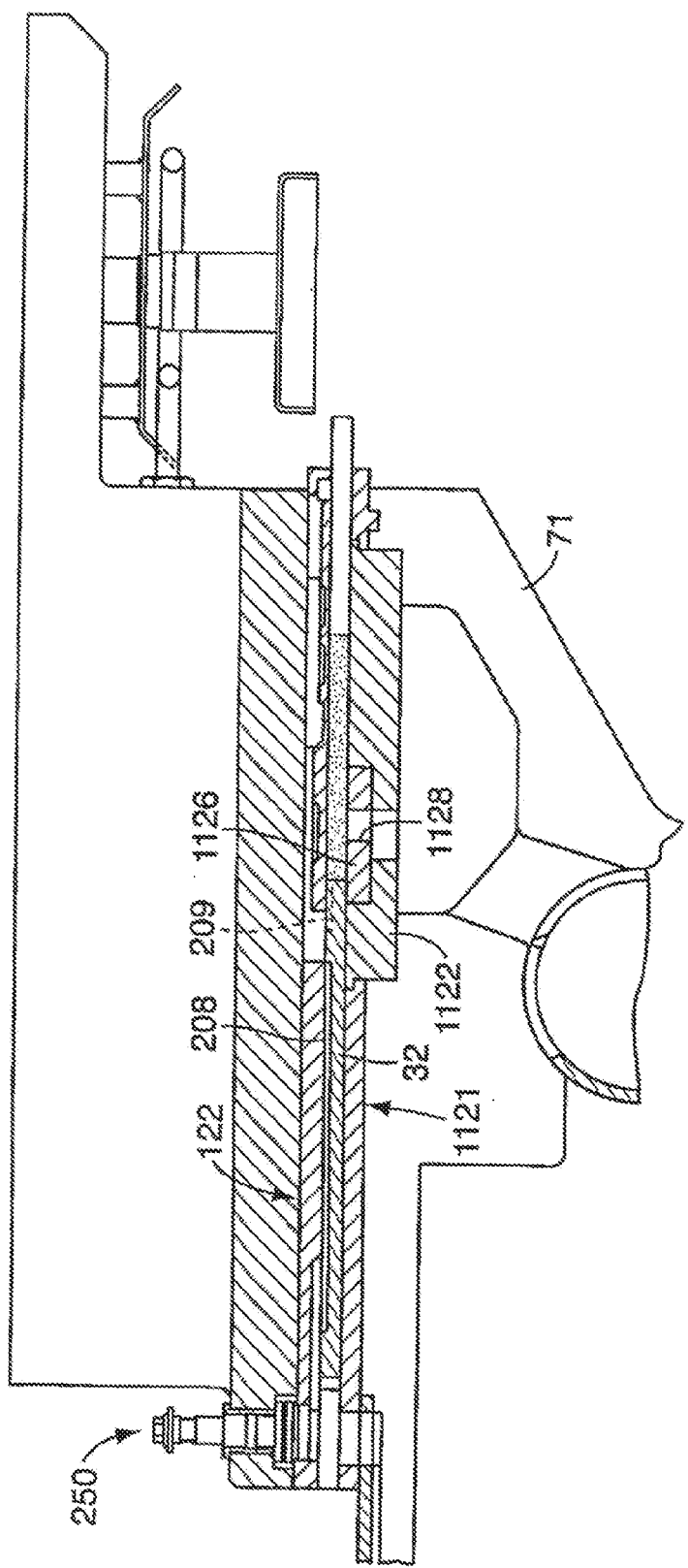
FIG. 13 is an enlarged fragmentary sectional view similar to FIG. 9A but having an alternate fill arrangement.

FIG. 13 illustrates the mold plate 32 and the breather plate 122 arranged above an alternate support plate 1121 having a fill plate 1122 fastened thereto and to the manifold housing 71. The fill plate 1122 mounts an insert plate 1126 that has a fill slot 1128 therethrough. The slot can be continuous or intermittent (corresponding to the location of the cavities) across a width of the cavity pattern.

Figure 14:
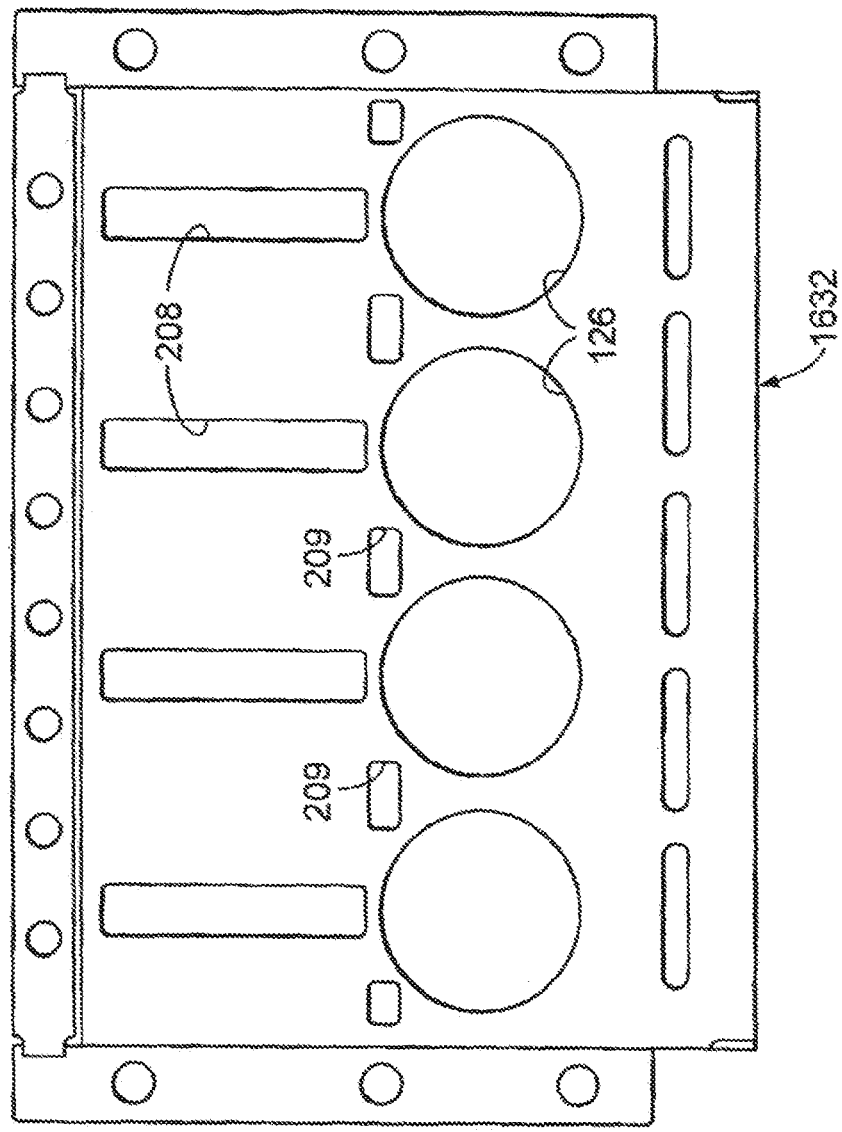
FIG. 14 is an enlarged fragmentary sectional view similar to FIG. 11A but having an alternate mold plate, with some components and/or panels removed for clarity.
Figure 15:
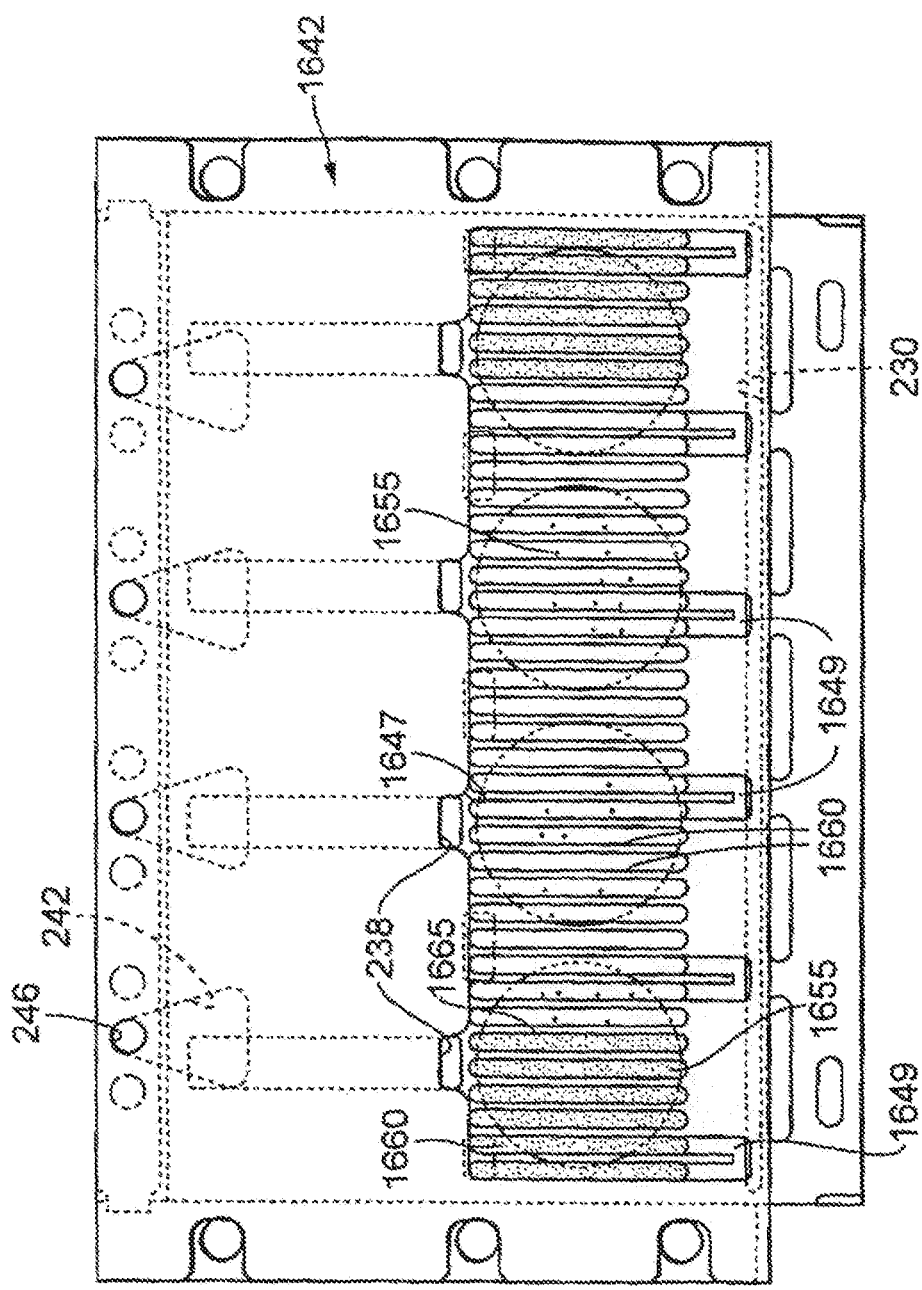
FIG. 15 is an enlarged fragmentary sectional view similar to FIG. 10A but illustrating the mold plate of FIG. 14 beneath an alternate breather plate.

FIGS. 14 and 15 illustrate an alternate mold plate 1632 having four cavities 126 in a row and arranged below an alternate breather plate 1642. The alternate breather plate 1642 includes an alternate recess arrangement 1647, but which functions similarly to the recess 237, and alternate branch regions 1649, but which functions similarly to the branch regions 222. Breather holes 1655 (not all of them shown) are located within elongated dished areas 1660, which are in communication with the recesses 1647.

Although a single row of cavities is shown in the mold plate 32 in FIGS. 10A-11B, 14 and 15, it is encompassed by the invention to provide multiple rows of cavities, in straight or staggered columns, such as described in U.S. Pat. Nos. 6,454,559; 6,517,340; 4,872,241; 6,572,360; and/or 3,747,160; or international patent publications WO 01/41575 and/or WO 02/102166, all herein incorporated by reference.

Figure 16:
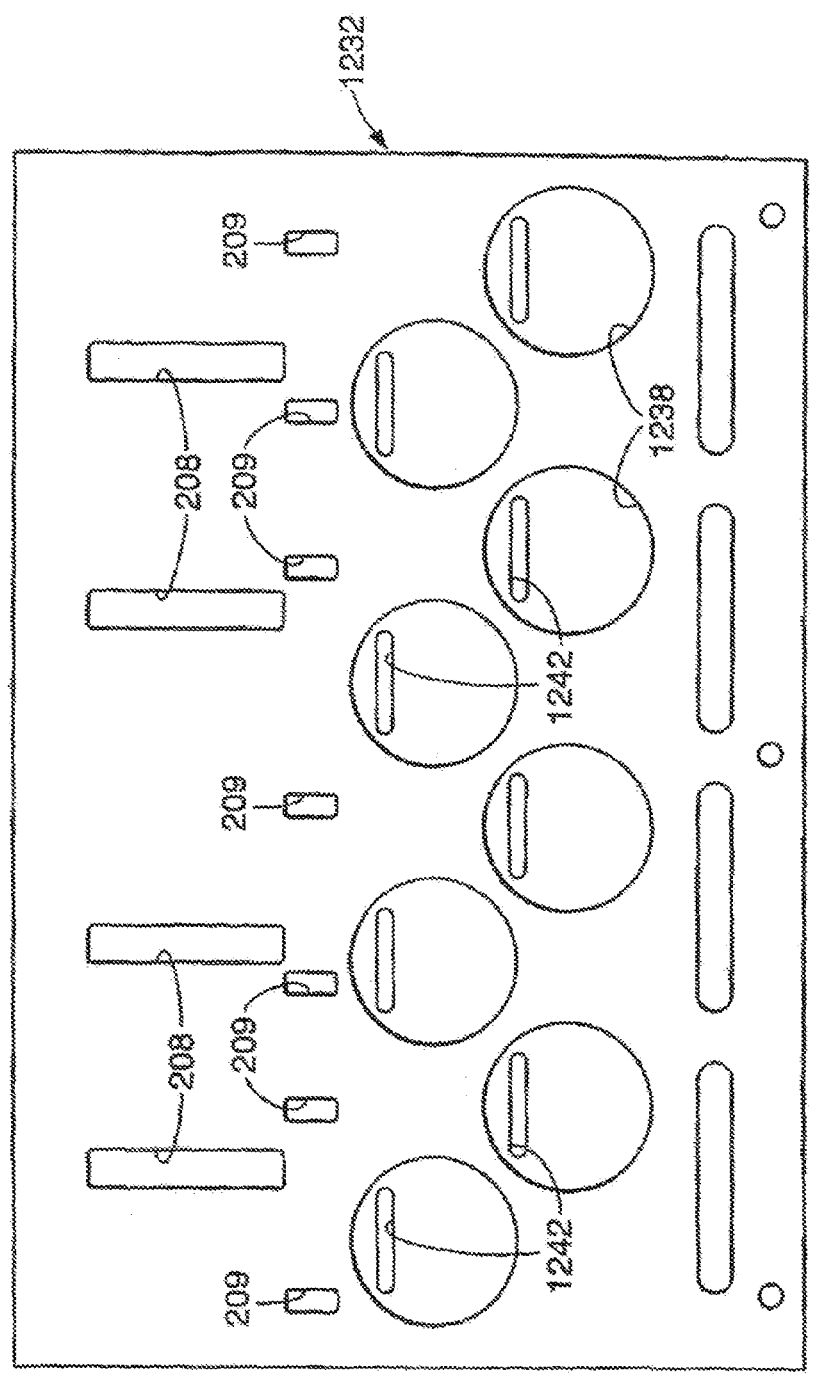
FIGS. 16-18 illustrate alternate mold plates with superimposed fill slots or openings, the mold plates usable with the systems of FIGS. 9A-9K or FIG. 13.
Figure 17:
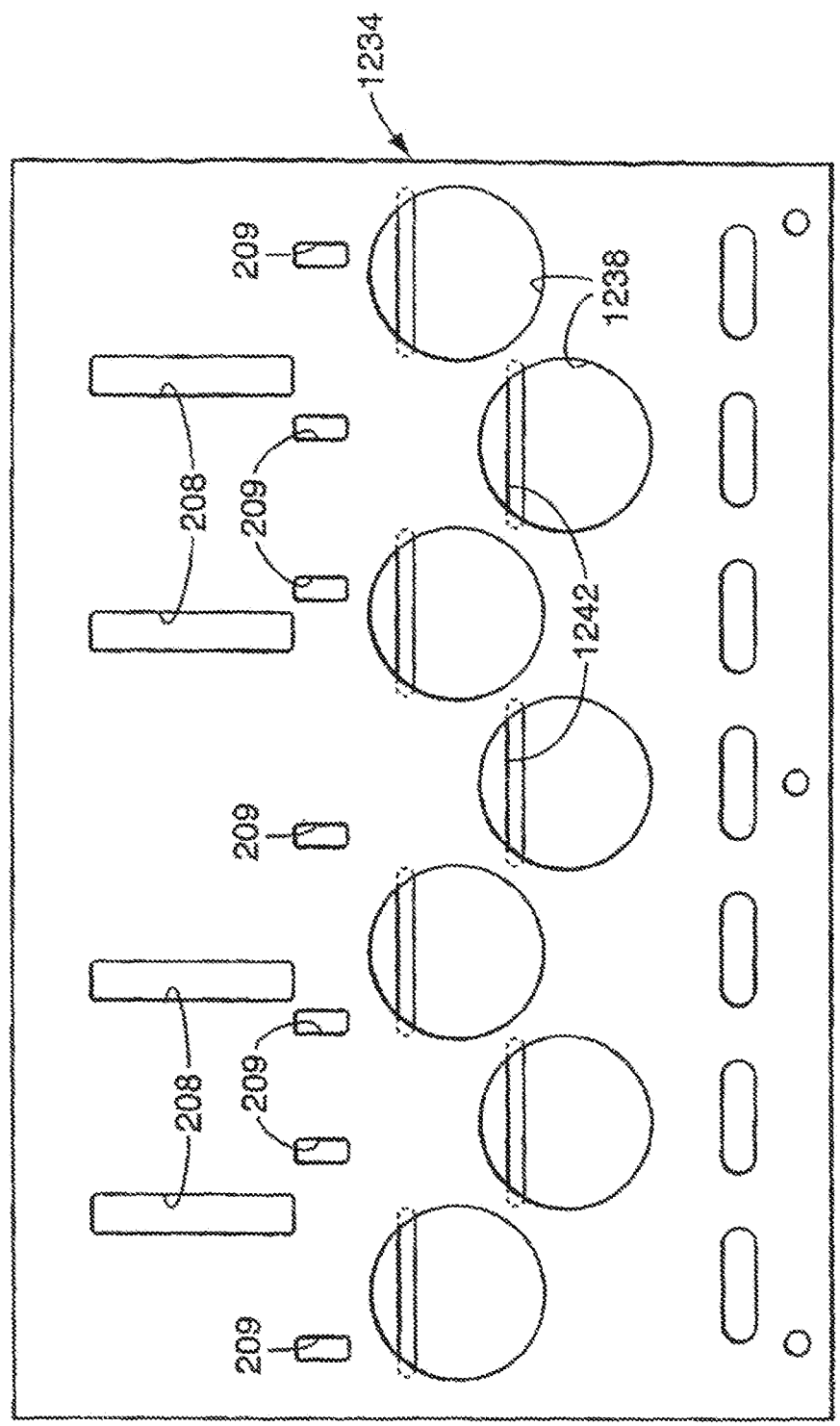
Figure 18:
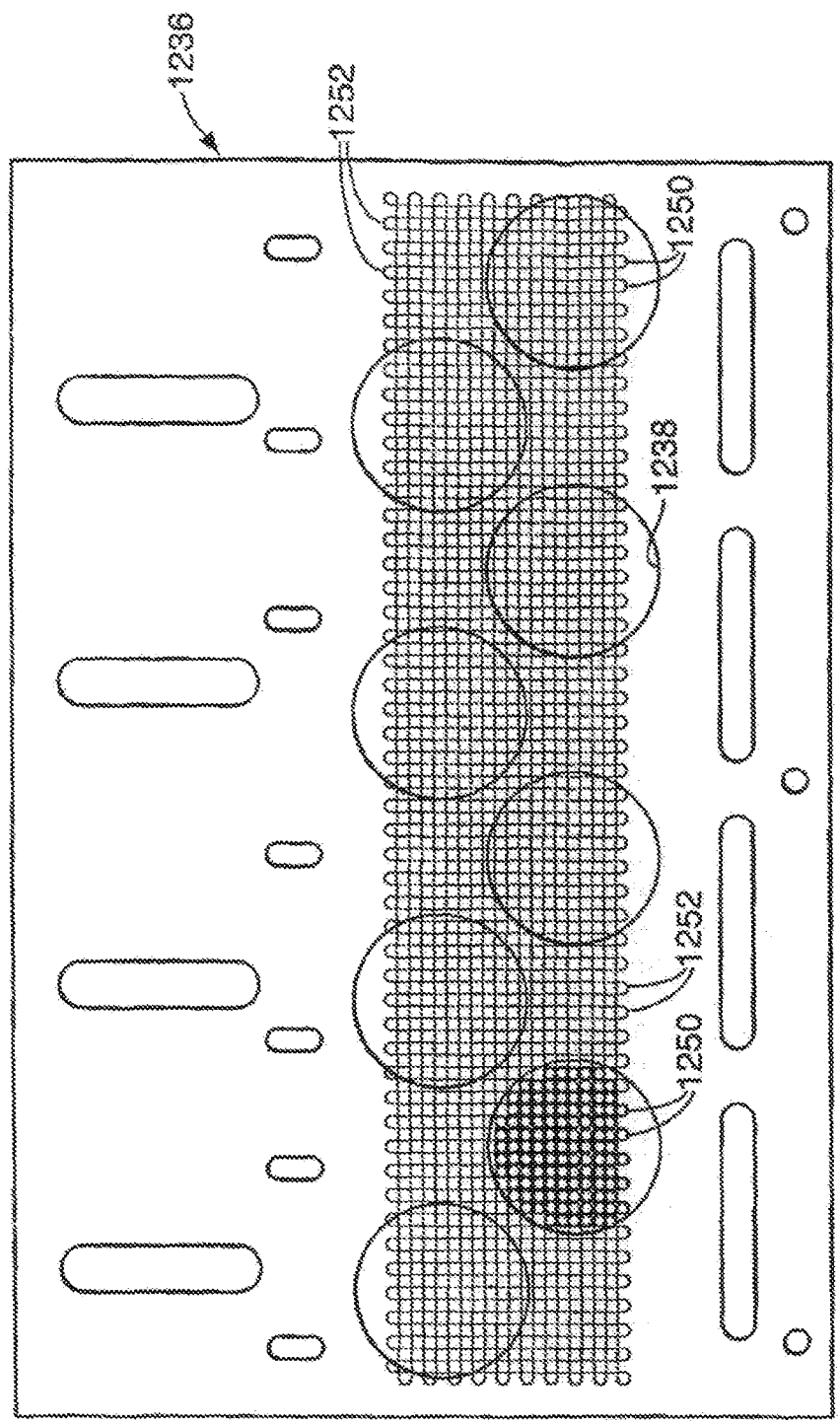

FIGS. 16-18 illustrate alternate mold plates 1232, 1234, 1236 having similar mold plate features as described above, but having two rows of cavities 1238 in staggered columns. In FIGS. 16 and 17 the cavities are filled by individual fill slots 1242 below the mold plates 1232, 1234. In FIG. 18, the cavities 1238 are filled by a plurality of fill apertures 1250 in registry with the cavities 1238. The apertures 1252 that are not in registry with the cavities are shown but are not drilled through the plate 1236.

Furthermore, the apparatus 20 can also have, in conjunction with the mold plate and fill plate arrangements, a stripper or seal off mechanism such as described in U.S. Pat. Nos. 4,821,376; 4,697,308; and/or 4,372,008, all herein incorporated by reference, or as available on current FORMAX F-26 machines.

Figure 12:
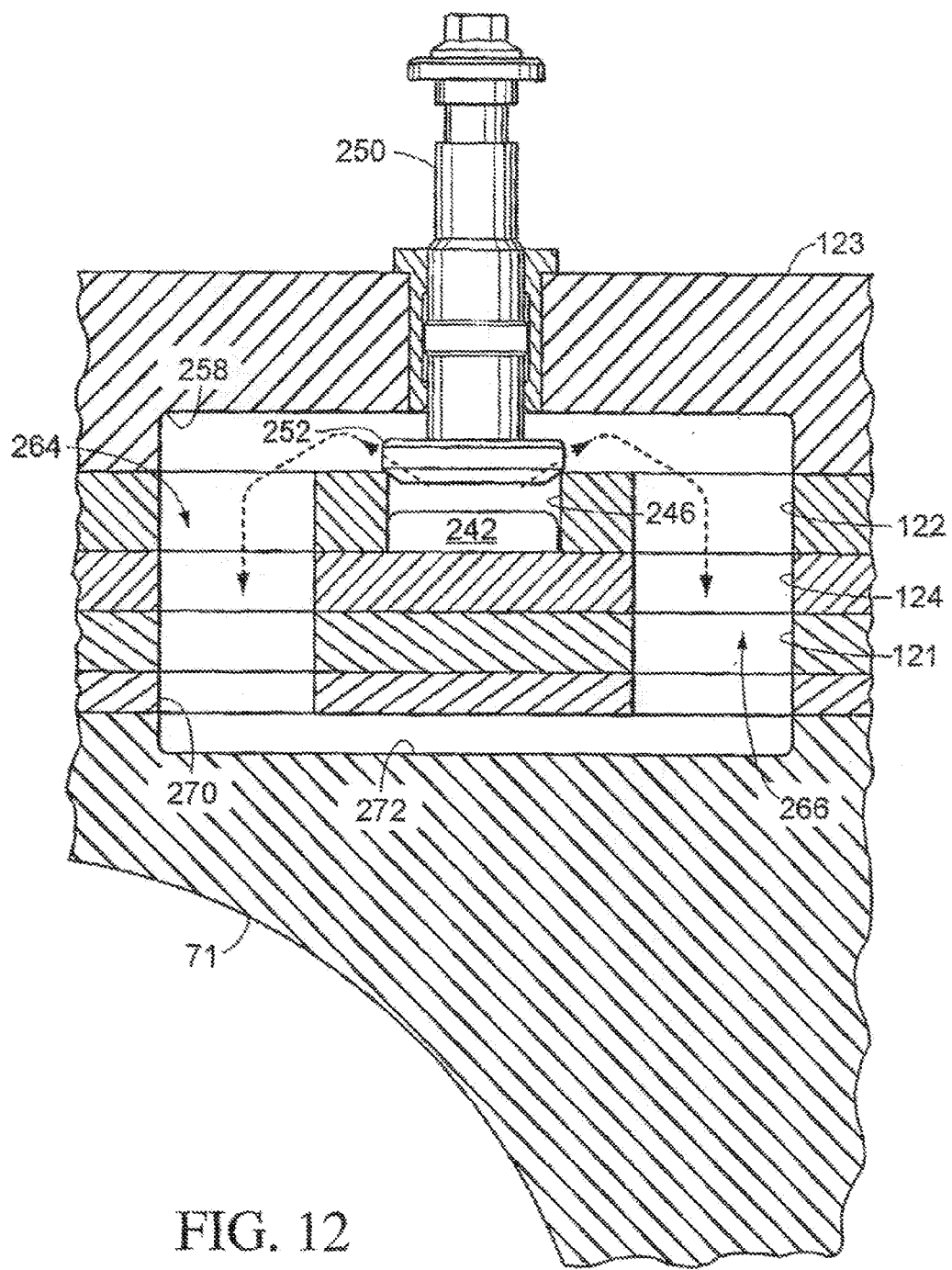
FIG. 12 is a fragmentary sectional view taken generally along line 12-12 of FIG. 9B.
Figure 19:
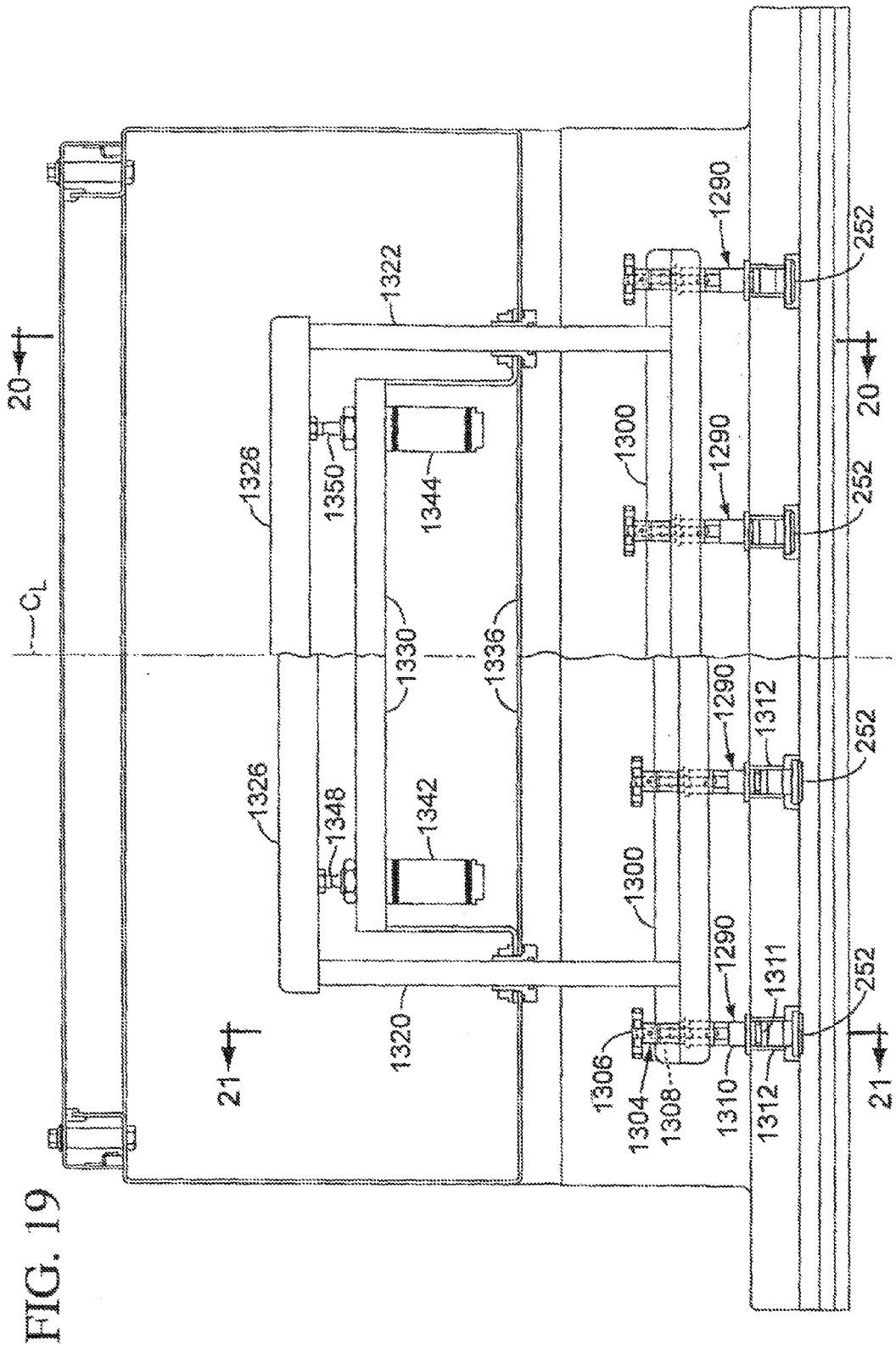
FIG. 19 is a sectional view of an alternate embodiment of the valve arrangement shown in FIG. 12, taken generally along line 19-19 from FIG. 9A, with some components and/or panels removed for clarity.

FIG. 19 illustrates an alternate valve arrangement than described in FIG. 12. The porting of the valve elements 252 remains the same. The mechanism for opening and closing the valve elements 252 is modified. The sectional view is broken along its vertical centerline CL to show two valves 1290 with elements 252 lowered, and closed, to the left of the centerline CL, and two valves 1290 with elements 252 raised, and opened, shown to the right of the centerline CL. It should be understood however that in operation all four valve elements raise-and-lower together to open and close the valves.

The valves 1290 are mounted on a support bar 1300. The valves 1290 are mounted to the bar by a threaded adjustment mechanism 1304. The adjustment mechanism includes a handle 1306 locked onto a threaded shaft 1308 that is threaded into a valve stem assembly 1310 such that when the threaded shaft 1308 is turned by the handle 1306, the threaded shaft selectively raises or lowers the valve element 252 by precise amounts to set valve clearance and to ensure that the valves seat at the same time given their common movement. The valve stem assembly includes a ring seal 1311 to seal against a stationary sleeve 1312 of the valve 1290.

The support bar 1300 is supported on two rods 1320, 1322. A crossbar 1326 spans between the rods 1320, 1322 and is fastened thereto. A bracket 1330 is supported on a machine wall 1336. A pair of pneumatic cylinders 1342, 1344 are fixed to the bracket 1330 and have actuation rods or piston rods 1348, 1350 fixed to the crossbar 1326. When the rods 1348, 1350 extend together from the cylinders 1342, 1344, the crossbar 1326 raises the rods 1320, 1322, which raises the support bar 1300, which raises the valve stems 1310 and the valve elements 252. This opens the valves 1290.

Contracting the rods 1348, 1350 into the cylinders 1342, 1344 has the opposite effect, lowering the valve elements 252 and closing the valves 1290.

The pneumatic cylinders 1342, 1344 are signal-connected via pneumatic tubing and electronics to the machine controller that can precisely control the raising and lowering of the valve element to be synchronized with the mold plate movements. The valve element can be positively raised and lowered according to a precisely controlled timing sequence rather than being controlled by vacuum or positive pressure in the suction chamber or pump chamber.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A method all removing air and food product fines from a reciprocating mold plate patty forming apparatus, comprising the steps of:
   providing a mold plate slidable along a first surface, said mold plate having a cavity that is reciprocable between a cavity fill position and a patty discharge position;
   providing a pressurized supply of food product material and a delivery channel for delivering pressurized food product material through said first surface and into said cavity when said reciprocating mold plate is in the cavity fill position;
   providing a breather plate on a side of said mold plate opposite said first surface, said breather plate having at least one breather hole that is in registry with said cavity when said mold plate is in the cavity fill position; and
   pumping expressed air and food product fines which were expressed through said breather hole during filling of said cavity with pressurized food product material, to a collection area by a pumping device, said pumping step being in addition to the expressing of air and food product fines caused by said filling of said cavity with pressurized food product material.

2. The method according to claim 1, wherein said step of pumping air and food product fines is further defined by the steps of:
   providing a pumping chamber;
   providing an air passage in fluid communication with said breather hole;

providing a first path for outside air to enter said air passage;

providing a second path for outside air combined with expressed air and food product fines expressed during filling of said cavity with food product material, to exit said air passage, and to enter said pumping chamber; and when said mold plate is near to said patty discharge position, opening said first and second paths to flush outside air into said air passage and to force outside air combined with expressed air and food product fines out of said air passage and into said pumping chamber.

3. The method according to claim 2, wherein said step of pumping expressed air and food product fines is further defined by the steps of: during retraction of said mold plate from said patty discharge position to said cavity fill position, pumping said outside air combined with expressed air and food product fines from said pumping chamber to said collection area.

4. A method of removing air and food product fines from a reciprocating mold plate patty forming apparatus, comprising the steps of:

providing a supply of pressurized food product;

providing a mold plate having a cavity;

reciprocating said mold plate on a support surface between a cavity fill position and a patty discharge position;

providing a breather plate facing said mold plate, said breather plate having at least one breather hole and an air passage, said air passage openable to outside air and to a chamber defined between the breather plate, the support surface, and a back face of the mold plate;

providing a discharge opening from said chamber to a collection area;

filling said cavity with pressurized food product and expressing air and food product fines through said breather hole and into said air passage;

moving said mold plate toward said patty discharge position while drawing a vacuum in said chamber;

as said mold plate moves to said patty discharge position, opening said air passage to outside air to flush outside air into said air passage and into said chamber, relieving said vacuum; and as said mold plate moves toward the cavity fill position, increasing pressure within said chamber by the retraction of said end face of said mold plate to pump air and fines through said discharge opening to said collection area.

5. The method according to claim 4, comprising the further step of: during filling of said cavity with food product, providing a flow path between said air passage and said discharge opening.

6. The method according to claim 4, comprising the further step of: during movement of said mold plate from said patty discharge position to said cavity fill position, after flushing said air passage with outside air, closing said passage to outside air as movement of said mold plate end face increases pressure in said chamber.

7. The method according to claim 4, comprising a further step of: during movement of said mold plate from said cavity fill position to said patty discharge position, closing said discharge opening.

* * * * *